United States Patent
Amizur et al.

(10) Patent No.: US 10,362,447 B2
(45) Date of Patent: Jul. 23, 2019

(54) APPARATUS, SYSTEM AND METHOD OF ANGLE OF DEPARTURE (AOD) ESTIMATION

(71) Applicant: INTEL IP CORPORATION, Santa Clara, CA (US)

(72) Inventors: Yuval Amizur, Kfar-Saba (IL); Nir Dvorecki, Herzeliya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 15 days.

(21) Appl. No.: 15/199,563

(22) Filed: Jun. 30, 2016

(65) Prior Publication Data

US 2017/0215087 A1    Jul. 27, 2017

Related U.S. Application Data

(60) Provisional application No. 62/281,345, filed on Jan. 21, 2016, provisional application No. 62/299,692, filed on Feb. 25, 2016.

(51) Int. Cl.
*H04W 4/00* (2018.01)
*H04W 4/02* (2018.01)
(Continued)

(52) U.S. Cl.
CPC .............. *H04W 4/025* (2013.01); *G01S 3/48* (2013.01); *G01S 5/08* (2013.01); *H04B 7/06* (2013.01);
(Continued)

(58) Field of Classification Search
CPC ..... H04W 16/28; H04W 4/043; H04W 64/00; H04W 4/025; H04L 5/0007; H04L 69/22;
(Continued)

(56) References Cited

U.S. PATENT DOCUMENTS

| | | | |
|---|---|---|---|
| 7,561,632 B1* | 7/2009 | van Zelst | H04B 7/0434 375/267 |
| 7,697,623 B2* | 4/2010 | Mehta | H04B 7/0691 375/260 |

(Continued)

FOREIGN PATENT DOCUMENTS

| | | |
|---|---|---|
| CN | 103945331 | 7/2014 |
| WO | 2015130618 | 9/2015 |
| WO | 2017127154 | 7/2017 |

OTHER PUBLICATIONS

U.S. Appl. No. 15/086,972, filed Mar. 31, 2016, 46 pages.

(Continued)

*Primary Examiner* — Hanh N Nguyen
(74) *Attorney, Agent, or Firm* — Shichrur & Co.

(57) ABSTRACT

Some demonstrative embodiments include apparatuses, devices, systems and methods of Angle of Departure (AoD) estimation. For example, an apparatus may include circuitry and logic configured to cause a wireless station to determine a beamforming scheme configured for AoD estimation, the beamforming scheme including a plurality of beamforming settings to be applied to a respective plurality of antennas, the beamforming scheme configured to transmit a plurality of tones in a plurality of directions such that a direction may be associated with at least one tone of the plurality of tones; and to sequentially transmit a plurality of transmissions according to the beamforming scheme, a transmission of the plurality of transmissions comprising a transmission via one or more antennas of the plurality of antennas according to one or more beamforming settings corresponding to the one or more antennas.

24 Claims, 10 Drawing Sheets

(51) Int. Cl.
   *H04L 29/06* (2006.01)
   *G01S 3/48* (2006.01)
   *H04L 5/00* (2006.01)
   *H04W 4/04* (2009.01)
   *H04W 16/28* (2009.01)
   *G01S 5/08* (2006.01)
   *H04B 7/06* (2006.01)
   *H04L 29/08* (2006.01)
   *H04B 7/0413* (2017.01)
   *H04W 64/00* (2009.01)
   *H04B 7/0452* (2017.01)

(52) U.S. Cl.
   CPC ............ *H04L 5/0007* (2013.01); *H04L 67/12* (2013.01); *H04L 69/22* (2013.01); *H04W 4/043* (2013.01); *H04W 16/28* (2013.01); *H04B 7/0413* (2013.01); *H04B 7/0452* (2013.01); *H04L 5/0023* (2013.01); *H04W 64/00* (2013.01); *H04W 64/003* (2013.01)

(58) Field of Classification Search
   CPC ..... H04L 29/06; H04B 7/0434; H04B 7/0696; H04B 17/00; H04B 7/02; H04B 3/54
   See application file for complete search history.

(56) References Cited

U.S. PATENT DOCUMENTS

| | | | |
|---|---|---|---|
| 7,822,128 B2* | 10/2010 | Maltsev | H04L 27/2637 375/260 |
| 8,244,174 B1 | 8/2012 | Kong | |
| 8,649,800 B2 | 2/2014 | Kalliola et al. | |
| 8,723,729 B2 | 5/2014 | Desai et al. | |
| 9,077,415 B2* | 7/2015 | Josiam | H04B 7/0697 |
| 9,295,010 B2* | 3/2016 | Karimi | H04W 52/246 |
| 9,699,618 B2 | 7/2017 | Singh et al. | |
| 9,755,797 B2* | 9/2017 | Wu | H04L 5/0023 |
| 9,814,051 B1 | 11/2017 | Shpak | |
| 10,028,089 B2 | 7/2018 | Na et al. | |
| 2009/0243932 A1 | 10/2009 | Moshfeghi | |
| 2014/0070996 A1 | 3/2014 | Kneckt et al. | |
| 2014/0072307 A1 | 3/2014 | Zamani et al. | |
| 2014/0162693 A1 | 6/2014 | Wachter et al. | |
| 2015/0188678 A1 | 7/2015 | Wu et al. | |
| 2016/0366548 A1* | 12/2016 | Wang | H04W 64/00 |
| 2017/0070893 A1 | 3/2017 | Wang et al. | |
| 2017/0131380 A1 | 5/2017 | Malik et al. | |
| 2017/0131381 A1 | 5/2017 | Malik et al. | |
| 2017/0212204 A1* | 7/2017 | Amizur | G01S 3/14 |
| 2017/0295004 A1 | 10/2017 | Amizur et al. | |
| 2018/0131540 A1 | 5/2018 | Malik et al. | |
| 2018/0310133 A1 | 10/2018 | Ramasamy et al. | |
| 2018/0317197 A1 | 11/2018 | Kasher et al. | |
| 2019/0086505 A1 | 3/2019 | Malik et al. | |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.
Office Action for U.S. Appl. No. 15/086,972, dated May 18, 2018, 16 pages.
International Search Report and the Written Opinion for International Application No. PCT/US2016/063277, dated Jan. 18, 2017, 8 pages.
Office Action for U.S. Appl. No. 15/086,972, dated Dec. 13, 2018, 12 pages.
Notice of Allowance for U.S. Appl. No. 15/086,972, dated Apr. 10, 2019, 11 Pages.

* cited by examiner

APPARATUS, SYSTEM AND METHOD OF ANGLE OF DEPARTURE (AOD) ESTIMATION

CROSS REFERENCE

This Application claims the benefit of and priority from U.S. Provisional Patent Application No. 62/281,345 entitled "Apparatus, System and Method of Angle of Departure (AoD) estimation", filed Jan. 21, 2016, and from U.S. Provisional Patent Application No. 62/299,692 entitled "Apparatus, System and Method of Angle of Departure (AoD) estimation", filed Feb. 25, 2016, the entire disclosures of which are incorporated herein by reference.

TECHNICAL FIELD

Embodiments described herein generally relate to Angle of Departure (AoD) estimation.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
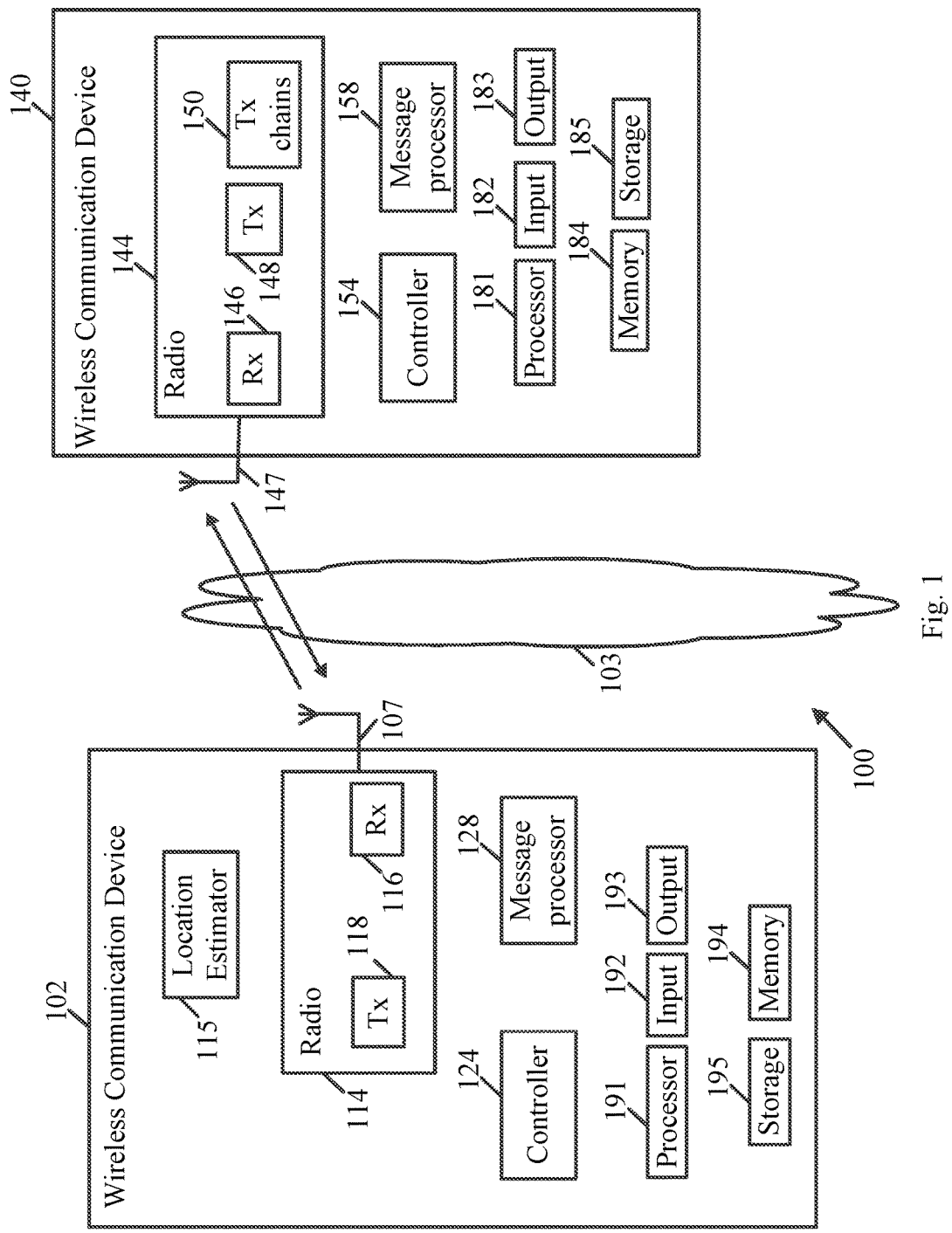
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wi-Fi Alliance (WFA) Specifications, devices and/or networks operating in accordance with existing WFA Peer-to-Peer (P2P) specifications (*WiFi P2P technical specification, version* 1.5, *Aug.* 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11*ac*-2013 ("*IEEE P*802.11*ac*-2013, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 4: *Enhancements for Very High Throughput for Operation in Bands below* 6 *GHz", December* 2013); *IEEE* 802.11*ad* ("*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band", 28 Dec.* 2012); IEEE-802.11REVmc ("*IEEE* 802.11-*REVmc*™/ *D*3.0, *June* 2014 *draft standard for Information technology—Telecommunications and information exchange between systems Local and metropolitan area networks Specific requirements; Part* 11: *Wireless LAN Medium Access Control* (*MAC*) *and Physical Layer* (*PHY*) *Specification*"); and/or IEEE 802.11az (*IEEE* 802.11*az: Next Generation Positioning*)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S1G) frequency band, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, and/or a wireless communication device 140.

In some demonstrative embodiments, wireless medium 103 may include, for example, a radio channel, an RF channel, a Wireless Fidelity (WiFi) channel, a cellular channel, an IR channel, and the like. One or more elements of system 100 may optionally be capable of communicating over any suitable wired communication links.

In some demonstrative embodiments, device 102 may include a mobile or a portable device.

In some demonstrative embodiments, device 102 may include, for example, a User Equipment (UE), a Mobile device (MD), a wireless Station (STA), a mobile computer, a laptop computer, an Internet of Things (IoT) device, a sensor device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device which incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a Smartphone, or the like.

In some demonstrative embodiments, device 140 may include, or may perform the functionality of, an Access Point (AP) station (STA).

In some demonstrative embodiments, device 140 may include a non-mobile or a static device.

In some demonstrative embodiments, device 140 may include, for example, a desktop computer, a router, a server, and/or any other device configured to perform the functionality of an AP.

In other embodiments, device 140 may include, or may perform the functionality of a non-AP STA.

In some demonstrative embodiments, device 102 may perform the functionality of a non-AP STA, and/or device 140 may perform the functionality of an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication medium 103 may include a wireless communication channel over a 2.4 GHz frequency band, a 5 GHz frequency band, a millimeterWave (mmWave) frequency band, e.g., a 60 GHz frequency band, a S1G band, and/or any other frequency band.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other network.

In some demonstrative embodiments, device 102 may include a location estimator 115 configured to estimate a location of device 102, e.g., as described below.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, devices 102 and/or 140 may be configured to perform, allow, and/or support, positioning, for example, WiFi positioning, e.g., next generation positioning, for example, to be implemented by and/or supported by an *IEEE* 802.11 *Specification*, e.g., an *IEEE* 802.11*az Specification*, and/or any other specification, standard, and/or protocol.

In some demonstrative embodiments, devices 102 and/or 140 may be configured to perform, allow, and/or support, one or more positioning operations configured to allow at least improved scalability.

In some demonstrative embodiments, for example, a positioning mechanism may use one or more Angle of Departure (AoD) techniques, in which a station, for example, an AP or a positioning responder station, e.g., device 140, may transmit one or more transmissions to be received by a STA, e.g., device 102.

In one example, the AoD techniques may allow the STA to listen to the transmissions from the AP, e.g., even without requiring the STA to perform transmissions. According to this example, the positioning mechanism may allow scalability, for example, as air usage may not depend on the number of STAs.

In some demonstrative embodiments, it may not be advantageous and/or efficient to use an AoD technique, which is based on the AP transmitting preambles from an antenna array, while switching antennas during the packet, and while a receiving STA, e.g., a mobile device, uses the preambles in order to estimate the AoD. For example, the AoD technique may require the STA to perform a major part of a calculation, and may also require the STA to obtain calibration data of the antennas, e.g., an antenna pattern, from the AP, and to store this information in a memory of the STA.

In some demonstrative embodiments, devices 102 and/or 140 may be configured to support an AoD estimation mechanism, in which an AP, e.g., device 140, may be configured to transmit in a plurality of directions, e.g., in all directions, for example, according to a predefined order, e.g., as described below.

In some demonstrative embodiments, a STA, e.g., device 102, may be configured to look for, determine, and/or detect, a direction from the plurality of directions, for example, based on at least one criterion, for example, to detect a strongest direction and/or an earliest direction, e.g., as described below.

In some demonstrative embodiments, device 102 may be configured to determine an AoD from the device 104, for example, based on the detected direction, e.g., as described below.

In some demonstrative embodiments, the AoD may include an azimuth AoD.

In some demonstrative embodiments, the AoD may include an elevation AoD.

In some demonstrative embodiments, the AoD may include a combination of the azimuth AoD and/or the elevation AoD.

In other embodiments, the AoD may include, or may be based on, one or more additional or alternative types of angles, and/or a combination of the azimuth AoD, the elevation AoD and/or one or more additional or alternative types of angles.

In some demonstrative embodiments, location estimator 115 and/or controller 124 may be configured to control, cause and/or trigger device 102 to estimate a location of device 102, for example, based at least on the AoD from device 140.

In some demonstrative embodiments, the AP, e.g., device 140, may be configured to transmit the transmissions in the plurality of directions according to an OFDM modulation scheme.

In some demonstrative embodiments, the AP may be configured to transmit each tone, or more than one tone, in a different direction, for example, according to the known pattern, e.g., as described below.

In some demonstrative embodiments, device 140 may be configured to determine a beamforming scheme configured for AoD estimation.

In some demonstrative embodiments, controller 154 may be configured to control, cause and/or trigger device 140 to determine the beamforming scheme configured for the AoD estimation.

In some demonstrative embodiments, the beamforming scheme may include a plurality of beamforming settings to be applied to a respective plurality of antennas of device 140.

In some demonstrative embodiments, the beamforming scheme may be configured to transmit a plurality of tones in a plurality of directions, such that a direction is associated with at least one tone of the plurality of tones, e.g., as described below.

In some demonstrative embodiments, a direction may include an azimuth AoD, an elevation AoD, a combination of an azimuth AoD and an elevation AoD, and/or any other angle and/or direction.

In some demonstrative embodiments, the plurality of tones may include a plurality of Orthogonal Frequency-Division Multiplexing (OFDM) tones of an OFDM symbol.

In some demonstrative embodiments, the beamforming scheme may be configured to transmit each tone of the plurality of tones in only one direction of the plurality of directions.

In some demonstrative embodiments, the beamforming scheme may be configured to transmit two or more tones in a same direction of the plurality of directions.

In some demonstrative embodiments, the plurality of directions may cover an angle of 360 degrees.

In some demonstrative embodiments, the plurality of directions may cover an angle less than 360 degrees, e.g., an angle of 180 degrees, for example, if device 140 is attached to a wall.

In some demonstrative embodiments, the STA, e.g., device 102, may be configured to look for, determine, and/or detect, at least one tone, based, for example, on at least one detection criterion, for example, to detect the strongest tone in its channel estimation data, e.g., as described below.

In some demonstrative embodiments, the AoD estimation mechanism described herein may be performed, for example, even without requiring the AP to communicate calibration data of the AP, and/or even without requiring the STA to receive and/or store the calibration data from the AP.

In some demonstrative embodiments, the AoD estimation mechanism described herein may allow, for example, a reduced calculation complexity, e.g., a minimal complexity, for example, at least at the STA.

In some demonstrative embodiments, the AoD estimation mechanism described herein may allow, for example, to at least reduce an amount and/or complexity of operations to be performed by the STA, and/or to allow almost all the burden to be on the AP, e.g., such that, for example, the STA may be required to perform calculations of a reduced complexity, e.g., a very simple calculation.

In some demonstrative embodiments, devices 102 and/or 140 may be configured to implement a connectionless AoD estimation method (mechanism), in which a STA, e.g., device 102, may estimate the AoD from an AP, e.g., device 140, for example, even with low complexity and/or even without having device 102 associate with and/or establish a connection with device 140.

Figure 2:
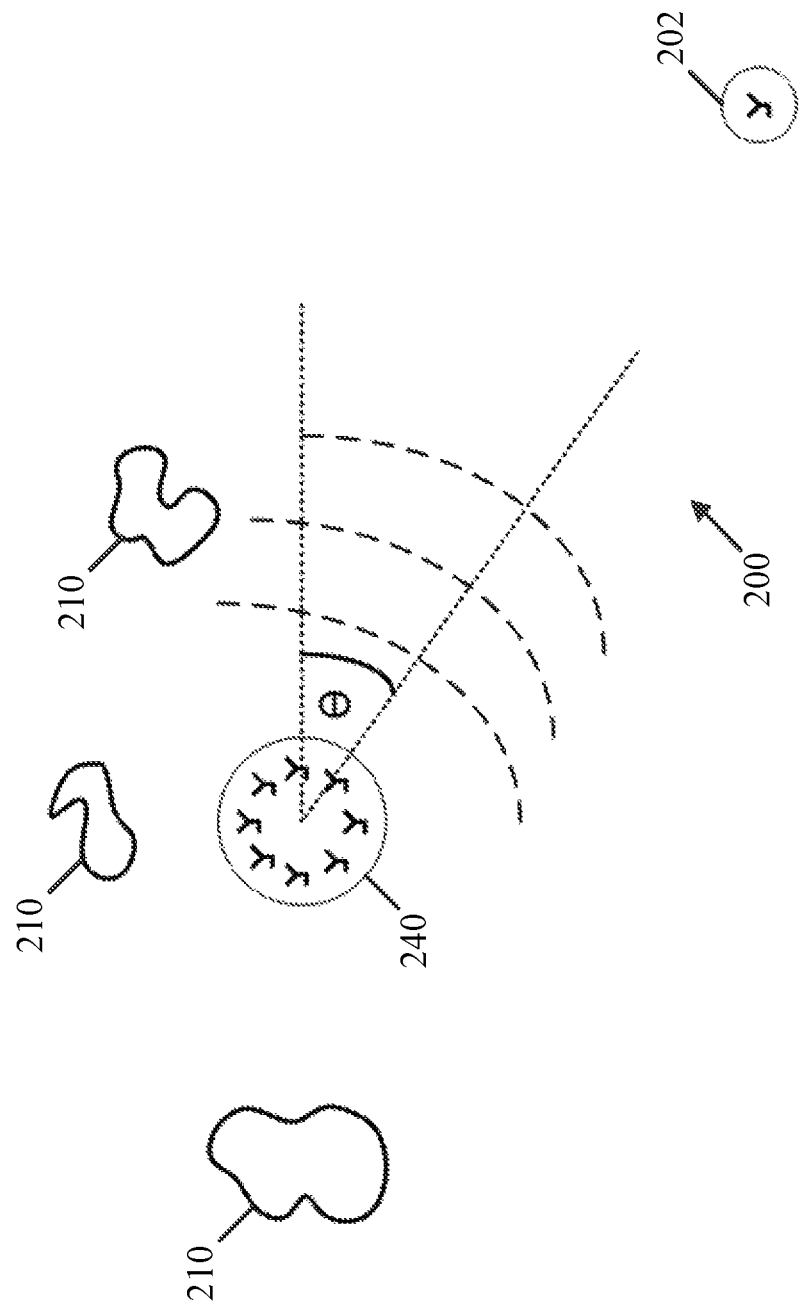
FIG. 2 is a schematic illustration of a transmission from an Access Point (AP), in accordance with some demonstrative embodiments.

Reference is made to FIG. 2, which schematically illustrates a transmission 200 from an AP 240, in accordance with some demonstrative embodiments. For example, AP 240 may perform the functionality of device 140 (FIG. 1).

In some demonstrative embodiments, as shown in FIG. 2, AP 240 may transmit transmission 200 via one or more antennas, or a multi array antenna, which may be received at an AoD, denoted θ, at a STA 202. For example, STA 202 may perform the functionality of device 102 (FIG. 1).

In some demonstrative embodiments, as shown in FIG. 2, STA 202 may include a single antenna element.

In some demonstrative embodiments, as shown in FIG. 2, one or more clusters 210, from which transmission 200 may be scattered, may be around AP 240.

In some demonstrative embodiments, STA 202 may estimate the AoD, and may determine a location of STA 202, for example, based on only one AP, for example, in a two-dimensional (2D) case, e.g., assuming height is known; or based on only two APs, for example, in a three dimensional (3D) case. In other embodiments, any other number of APs may be utilized to determine the position of STA 202.

In some demonstrative embodiments, the AP 240 may transmit at least one tone, for example, every tone or several tones, in a different direction.

In some demonstrative embodiments, the AP 240 may transmit tones in different directions, for example, by applying different settings of specific phases to antenna elements of the AP 240, e.g., during transmission 200.

In some demonstrative embodiments, it may be possible to preemptively calculate the necessary phases for each tone from each transmit antenna through a calibration process, for example, if the antenna array is available in advance.

In some demonstrative embodiments, the AP 240 may send, e.g., during operational mode, a packet, in which for several predefined symbols, every tone is transmitted with the above mentioned phase from each transmit antenna. For example, the AP 240 may implement a beamforming scheme, for example, a Capon beamforming scheme, and/or any other suitable method to choose the phases.

In some demonstrative embodiments, STA 202 may estimate an AoD of the transmission 200, for example, based on the transmission 200 from the AP 240.

In some demonstrative embodiments, different propagation delays between the antenna array of AP 240 and the antenna of STA 202, for example, may cause different tones to be received at STA 202, e.g., with different amplitudes and/or phases.

In some demonstrative embodiments, STA 202 may process one or more, e.g., all, of the different tones, and may estimate the AoD from AP 240.

In some demonstrative embodiments, an association of each tone to a specific transmit angle may be determined, for example, during the calibration procedure, or dynamically.

In some demonstrative embodiments, STA 202 may be aware of which angle was chosen for each tone, e.g., the association may be preconfigured, or signaled to the STA 202, e.g., from AP 240.

In some demonstrative embodiments, STA 202 may be configured to estimate the AoD, for example, by choosing a tone, which is received with the highest power from AP 240, and/or base don any other additional or alternative criterion, e.g., a timing criterion to select a tone received at an earliest time.

In one example, tones transmitted at the angle of the line-of-sight (LOS) may be expected to be of higher power, and/or received earlier, than tones transmitted at other angles.

Figure 3:
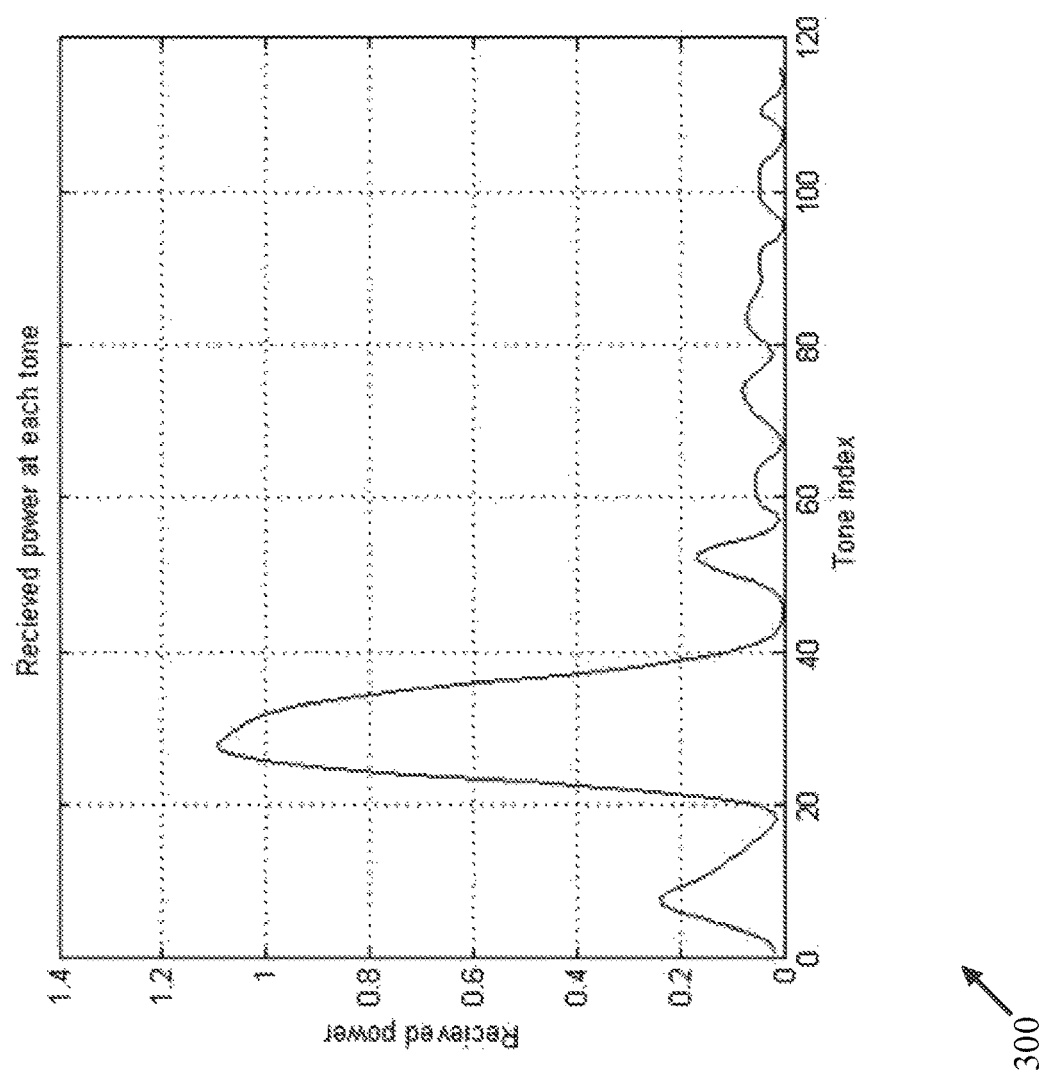
FIG. 3 is a schematic illustration of a graph depicting received power versus tone index, in accordance with some demonstrative embodiments.

Reference is made to FIG. 3, which schematically illustrates a graph 300 depicting received power versus tone index, in accordance with some demonstrative embodiments.

In some demonstrative embodiments, graph 300 may simulate a transmission between an AP and a STA, e.g., device 102, which is located at 90 degrees in relation to the AP, e.g., device 140.

In one example, the AP may include eight antennas in a circular uniform array, e.g., a single instance of a B3 Hotspot WinnerII model, and the STA may include a single antenna. For example, the STA may perform the functionality of STA 202 (FIG. 2); and/or the AP may perform the functionality of AP 240 (FIG. 2).

In some demonstrative embodiments, the transmission from the AP may include, for example, 116 tones with a 312.5 Kilohertz (KHz) subcarrier spacing. Each tone may be transmitted, for example, at a different angle along a 360 degree circle, e.g., with nearby tones used for nearby angles, or according to any other scheme assigning a plurality of tones to a plurality of directions.

In some demonstrative embodiments, the AP may implement a Capon beamformer, to determine beamforming settings to transmit the plurality of tones directed in the plurality of directions, e.g., as follows:

$$\theta_k = \frac{2\pi}{116}(k-1) \tag{1}$$

$$X_k = \frac{R_k^{-1} a_k(\theta_k)}{a_k^H(\theta_k) R_k^{-1} a_k(\theta_k)} \tag{2}$$

wherein k denotes a tone index, and $\theta_k$ denotes an angle, at which the tone with the index k is to be transmitted, wherein $a_k(\theta_k)$ denotes a vector $a_k(\theta_k) \in C^{8 \times 1}$, which may include an expected steering vector from the eight transmit antennas to the receiver, e.g., as follows:

$$a_k(\theta_k) = \exp\left(-\frac{2i\pi}{\lambda_k} r_{T_x}^T r_{\theta_k}\right) \tag{3}$$

wherein $\lambda_k$ denotes a subcarrier wavelength, $r_{T_x}$ denotes a vector pointing at the transmit antennas, and $r_{\theta_x}$ denotes a unit vector at the required angle $\theta_k$, and wherein $R_k$ denotes a matrix $R_k \in C^{8 \times 8}$, e.g., as follows:

$$R_k = \frac{1}{2\pi} \int a_k(\theta_k) a_k(\theta_k)^H d\theta_k \tag{4}$$

In other embodiments, any other beamforming settings, e.g., according to any other type of beamformer scheme, may be utilized.

In some demonstrative embodiments, as shown in FIG. 3, there may be a tone corresponding to a peak in the received power, e.g., as received by a STA, e.g., the STA 202 (FIG. 2). For example, the STA, e.g., STA 202 (FIG. 2), may detect the peak in the received power, and may determine the tone corresponding to the peak in the received power. The STA may then determine an AoD corresponding to the detected tone, for example, based on a mapping, e.g., an association, between the plurality of tones and a plurality of directions.

Figure 4:
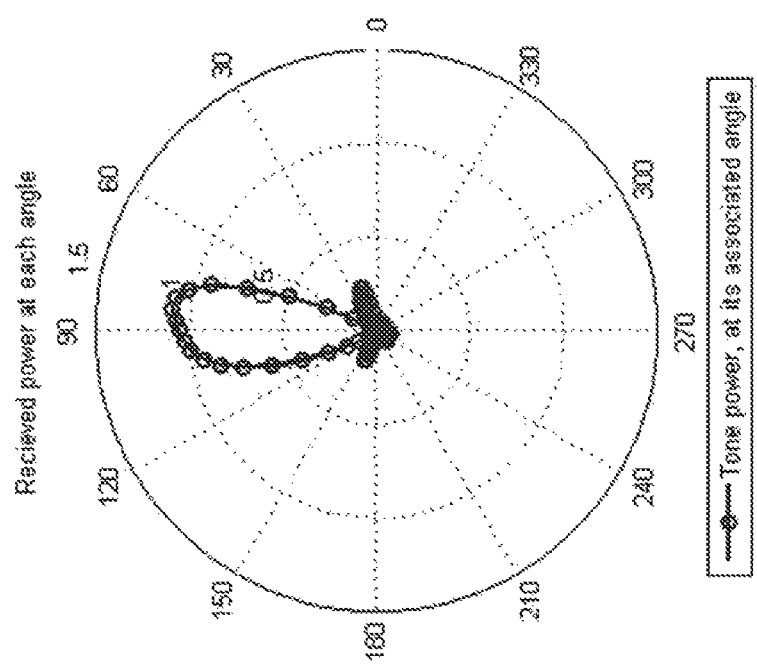
FIG. 4 is a schematic illustration of a graph depicting received power versus transmit angle, in accordance with some demonstrative embodiments.

Reference is made to FIG. 4, which schematically illustrates a graph 400 depicting received power versus transmit angle, in accordance with some demonstrative embodiments.

In some demonstrative embodiments, a STA, e.g., STA 202 (FIG. 2), may associate between the received power of a received tone, and a transmit angle of the received tone.

In some demonstrative embodiments, graph 400 may depict the association between received power and transmit angle, for example, after the STA associates each tone with a respective predefined transmit angle.

Referring back to FIG. 1, in some demonstrative embodiments, device 140 may be configured to transmit several tones in the same angle.

In some demonstrative embodiments, a transmission of a plurality of tones in the same angle may enable device 102, for example, to benefit from frequency diversity.

In some demonstrative embodiments, the transmission of a plurality of tones in the same angle may enable device 102, for example, to employ a time-of-flight (ToF) estimation, e.g., in order to select a LOS angle.

Figure 5:
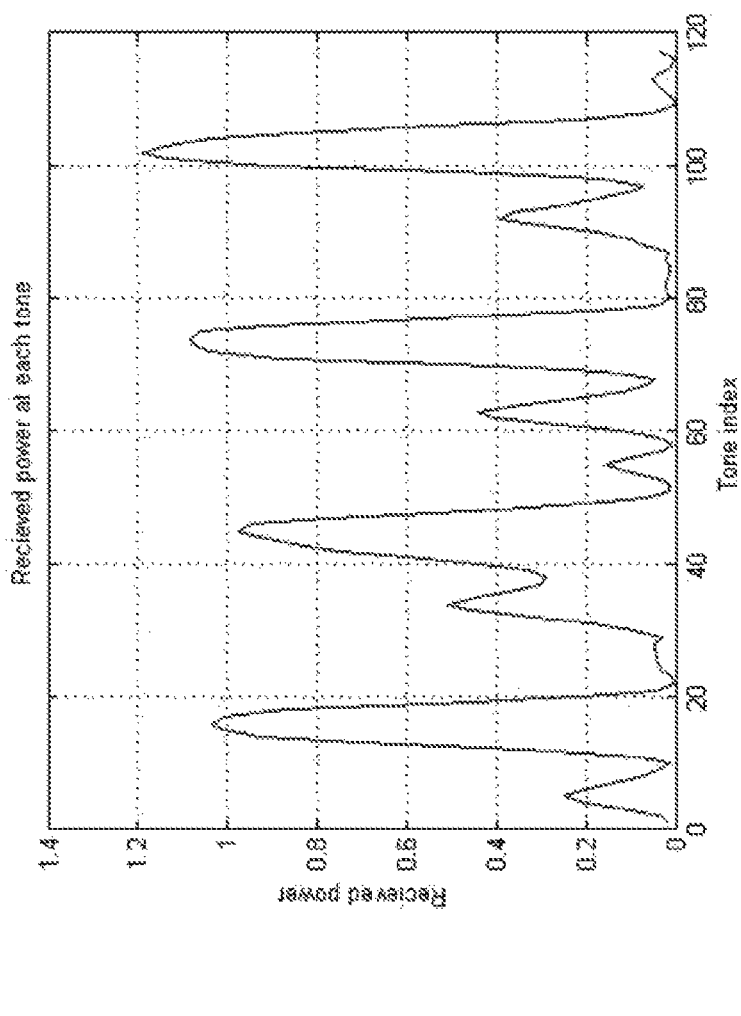
FIG. 5 is a schematic illustration of a graph depicting received power versus tone index, in accordance with some demonstrative embodiments.

Reference is made to FIG. 5, which schematically illustrates a graph 500 depicting received power versus tone index, in accordance with some demonstrative embodiments.

In some demonstrative embodiments, graph 500 may simulate a transmission of a plurality of tones in the same angle between the AP and the STA described above with respect to graph 300, for example, while two or more tones may be associated with and transmitted in the same direction.

In one example, the AP may set the transmit angles of the tones, such that there may be two or more tones transmitted in the same angle. For example, an angle may be associated with a plurality of tones, e.g., as follows:

$$\theta_k = \frac{4\pi}{116}(k-1) \bmod 29. \quad (5)$$

According to this example, an angle, e.g., every angle or only some of the angles, in a range between the angles θ and π, may be transmitted four times, e.g., using different tones (subcarriers).

In some demonstrative embodiments, a second OFDM symbol may be transmitted, for example, for angles in the range between π and 2π.

Referring back to FIG. 1, in some demonstrative embodiments, device 140 may be configured to transmit the different symbols and/or tones with different phases from all antennas of device 140, e.g., simultaneously, for example, to allow a simple estimation of the AoD at the receiver device, e.g., as described above.

In some demonstrative embodiments, device 140 may be configured to transmit the symbols and/or tones in the plurality of directions, for example, in a sequence of two or more transmissions, e.g., as described below.

In some demonstrative embodiments, device 140 may include one or more transmit chains 150, e.g., Radio Frequency (RF) Tx chains. For example, transmit chains 150 may be implemented as part of Tx 148.

In one example, the one or more transmit chains 150 may include a single transmit chain 150.

In another example, the one or more transmit chains 150 may include two or more transmit chains 150.

In some demonstrative embodiments, simultaneous transmission from all antennas of device 140, may require device 140 to have as many transmit chains 150 as the number of antennas 147, e.g., a separate or different RF transmit chain for each antenna of device 140.

In some demonstrative embodiments, implementing a different RF transmit chain for each antenna may be very costly, e.g., for production, and/or in terms of a calibration process, since each chain may require different calibration.

In some demonstrative embodiments, devices 102 and/or 140 may be configured to enable performing the AoD estimation, e.g., as described above, for example, even if a number of transmit chains 150 of device 140 is less than a number of antennas of device 140, e.g., as described below. For example, a few, e.g., or even a single transmit chain 150, may be used by device 140 with a large number of antennas, e.g., as described below.

In one example, device 140 may have at least two antennas 147, and the single transmit chain 150.

In another example, device 140 may have a first number, denoted N1, of the plurality of antennas, e.g., 8 or more antennas 147, and a second number, denoted N2, of transmit chains 150, wherein N2<N1, e.g., N2<8.

In some demonstrative embodiments, device 140 may be configured to use one or more transmit chains 150 of device 140 to transmit a first transmission via one or more antennas of device 140, e.g., to simultaneously transmit with only a set of the antennas of device 140, e.g., as described below.

In some demonstrative embodiments, device 140 may be configured to switch the one or more transmit chains 150 to use one or more other antennas, e.g., to simultaneously transmit a second transmission with another set of the antennas of device 140, e.g., a set of antennas which were not previously used for the first transmission, e.g., as described below.

For example, if device 140 includes only a single Tx chain 150, device 140 may be configured to sequentially switch the single Tx chain 150 between the plurality of antennas 147, e.g., such that the Tx chain 150 may be connected to one antenna at a time.

In another example, for example, if device 140 includes N1 antennas and N2>1 Tx chains 150, device 140 may be configured to sequentially switch the N2 Tx chains 150 between a plurality of antenna subsets, e.g., including N2 antennas.

In some demonstrative embodiments, device 102 may be configured to buffer the received symbols from a set of antennas, and to add the received symbols to previously received symbols from a previous set of antennas, for example, to emulate reception of the symbols from device 140 with a multiple number of transmit chains, e.g., as described below.

In some demonstrative embodiments, device 140 may not be required to implement an entire transmit chain per each antenna. For example, device 140 may have a number of transmit chains 150 which is less than the number of antennas 147, e.g., even a single transmit chain, which is able to switch between two or more antennas 147, e.g., between all of the antennas 147, e.g., as described below.

In some demonstrative embodiments, device 102 may be able to determine the estimation of the AoD in an efficient and/or a simple manner, for example, by buffering and adding the received signals of the sequence of transmissions from device 140 e.g., as described below.

In some demonstrative embodiments, device 140 may determine the beamforming scheme configured for the AoD estimation, e.g., as described above.

In some demonstrative embodiments, the beamforming scheme may include a plurality of beamforming settings to be applied to a respective plurality of antennas 147, e.g., as described above.

In some demonstrative embodiments, the beamforming scheme may be configured to transmit a plurality of tones in a plurality of directions, for example, such that a direction of the plurality of directions is associated with at least one tone of the plurality of tones, e.g., as described above.

In some demonstrative embodiments, device 140 may be configured to transmit the plurality of tones in the plurality of directions, for example, by sequentially switching at least one Tx chain 150 between two or more antennas 147, e.g., as described below.

In some demonstrative embodiments, controller 154 may be configured to control, cause and/or trigger device 140 to sequentially transmit a plurality of transmissions according to the beamforming scheme.

In some demonstrative embodiments, a transmission of the plurality of transmissions may include a transmission via one or more antennas of the plurality of antennas 147 according to one or more beamforming settings corresponding to the one or more antennas of the plurality of antennas 147, e.g., as described below.

In some demonstrative embodiments, the beamforming scheme may be configured to transmit each tone of the plurality of tones in only one direction of the plurality of directions, e.g., as described above.

In some demonstrative embodiments, the beamforming scheme may be configured to transmit each tone in respective direction of the plurality of directions, e.g., as described above.

In some demonstrative embodiments, the beamforming scheme may be configured to transmit two or more tones in a same direction of the plurality of directions, e.g., as described above.

In some demonstrative embodiments, a combination of the plurality of directions may cover an angle of about 360 degrees, e.g., as described above.

In some demonstrative embodiments, the plurality of directions may cover an angle less than 360 degrees, e.g., an angle of 180 degrees, for example, if device 140 is attached to a wall, e.g., as described above.

In some demonstrative embodiments, controller 154 may be configured to control, cause and/or trigger device 140 to transmit a first transmission of the plurality of transmissions via one or more first antennas of the plurality of antennas 147, for example, according to one or more first beamforming settings of the plurality of beamforming settings.

In some demonstrative embodiments, controller 154 may be configured to control, cause and/or trigger device 140 to transmit a second transmission of the plurality of transmissions via one or more second antennas of the plurality of antennas 147, e.g., subsequent to the first transmission, for example, according to one or more second beamforming settings of the plurality of beamforming settings.

In some demonstrative embodiments, controller 154 may be configured to control, cause and/or trigger device 140 to sequentially transmit the plurality of transmissions, for example, by sequentially switching the one or more Tx chains 150 between the plurality of antennas 147.

In some demonstrative embodiments, controller 154 may be configured to control, cause and/or trigger device 140 to transmit the first transmission of the plurality of transmissions via the one or more Tx chains 150 and the one or more first antennas of the plurality of antennas 147.

In some demonstrative embodiments, controller 154 may be configured to control, cause and/or trigger device 140 to switch the one or more Tx chains 150 to the one or more second antennas of the plurality of antennas 147, e.g., subsequent to the first transmission, for example, to transmit the second transmission of the plurality of transmissions via the one or more second antennas.

In some demonstrative embodiments, controller 154 may be configured to control, cause and/or trigger device 140 to sequentially switch a single Tx chain 150 between the plurality of antennas 147, for example, to transmit each transmission of the plurality of transmissions via a respective antenna of the plurality of antennas 147, for example, if device 140 includes a single Tx chain 150.

In some demonstrative embodiments, controller 154 may be configured to control, cause and/or trigger device 140 to sequentially transmit the plurality of transmissions, for example, by sequentially switching two or more TX chains 150 between the plurality of antennas, e.g., if device 140 includes two one or more TX chains 150.

In some demonstrative embodiments, device 140 may be configured to use more than one transmit chain 150 to transmit the symbols. For example, device 140 may be configured to implement two or more transmit chains 150 to simultaneously transmit from two or more antennas 147 at the same time, For example, device 140 may switch the two or more transmit chains 150 between a plurality of subsets of two or more respective antennas, e.g., each subset may include a different combination of two or more antennas 147, e.g., as described below.

In some demonstrative embodiments, controller 154 may be configured to control, cause and/or trigger device 140 to transmit a first transmission of the plurality of transmissions via two or more Tx chains 150 and two or more first antennas of the plurality of antennas 147.

In some demonstrative embodiments, controller 154 may be configured to control, cause and/or trigger device 140 to switch the two or more Tx chains 150 to two or more second antennas of the plurality of antennas 147, for example, to transmit a second transmission of the plurality of transmissions via the two or more second antennas of antennas 147, e.g., subsequent to the first transmission.

In some demonstrative embodiments, device 140 may be configured to separate between the plurality of transmissions to be transmitted by device 140 according to the beamforming scheme, for example, to enable device 102 to differentiate between the plurality of transmissions, e.g., as describe below.

In some demonstrative embodiments, there may be a delay ("antenna switching time period") for switching a transmit chain 150 between first and second antennas 147, for example, during the sequential transmission of the plurality of transmissions. For example, the antenna switching time period may last several microseconds.

In some demonstrative embodiments, during the switching time period, a transmitted signal may contain impairments, e.g., even large impairments, which may be due to the switching process.

In some demonstrative embodiments, device 140 may be configured to inform device 102, that one or more symbols, e.g., to be transmitted during the switching period, are to be ignored.

In some demonstrative embodiments, device 140 may be configured to transmit one or more non-valid signals, e.g., during the antenna switching time period, or may even stop the transmission entirely, e.g., until device 140 completes the switching process.

In some demonstrative embodiments, controller 154 may be configured to control, cause and/or trigger device 140 to transmit one or more non-valid tones between first and second consecutive transmissions of the plurality of transmissions, for example, to enable device 102 to differentiate between the plurality of transmissions, e.g., as describe below.

In some demonstrative embodiments, device 140 may be configured to signal information with respect to one or more attributes and/or parameters corresponding the beamforming scheme, for example, to enable a STA, e.g., device 102, to receive and/or process the transmissions according to the beamforming scheme, e.g., as described below.

In some demonstrative embodiments, controller 154 may be configured to control, cause and/or trigger device 140 to transmit an announcement frame including information indicating an association between the plurality of directions and the plurality of tones.

In some demonstrative embodiments, the announcement frame may include an indication of a number of the one or more non-valid tones, for example, to be transmitted during the switching period for switching the Tx chains 150, e.g., to enable device 102 to differentiate between the at least two sequential transmissions from device 140.

In some demonstrative embodiments, the announcement frame may optionally include a field including information indicating the number of the one or more non-valid tones to be transmitted during the switching period.

In some demonstrative embodiments, the announcement frame may optionally include a field including information indicating a number of symbols to be used by device 140 during the switching operation for switching one or more Tx chains 150 between antennas 147.

In some demonstrative embodiments, the announcement frame may optionally include a field including a codebook, which may indicate the mapping of the tones in each symbol to respective physical angles. In other embodiments, the codebook field may be omitted, for example, if the codebook is predefined, preconfigured and/or preset e.g., by a Standard.

In some demonstrative embodiments, the announcement frame may optionally include a field corresponding to calibration and/or beam-shape patterns, which may be used by a receiver of the announcement frame, e.g., device 102, for example, to estimate the AoD.

In some demonstrative embodiments, the mapping of the plurality of tones may associate two or more tones with a same direction of the plurality of directions, e.g., as described above.

In some demonstrative embodiments, the mapping of the tones to the plurality of directions may be predefined and/or preconfigured.

In some demonstrative embodiments, the mapping of the tones to the plurality of directions may be signaled from device 140, e.g., in the announcement frame from device 140.

In some demonstrative embodiments, device 102 may receive the announcement frame from device 140.

In some demonstrative embodiments, controller 124 may be configured to control, cause and/or trigger device 102 to process the announcement frame from device 140.

In some demonstrative embodiments, device 102 may receive the announcement frame, and may receive two or more sequential transmissions from device 140.

In some demonstrative embodiments, device 102 may perform one or more operations to determine the AoD from device 140, for example, by processing the two or more sequential transmissions from device 140, for example, based on the association between the plurality of directions and the plurality of tones and/or any other additional or alternative information in the announcement frame, e.g., as described below.

In some demonstrative embodiments, controller 124 may be configured to control, cause and/or trigger device 102 to determine a plurality of tone powers of a respective plurality of tones based on the at least two sequential transmissions from device 140.

In some demonstrative embodiments, controller 124 may be configured to control, cause and/or trigger device 102 to differentiate between the at least two sequential transmissions from device 140, for example, based on the one or more non-valid tones received between the at least two sequential transmissions from device 140.

In some demonstrative embodiments, controller 124 may be configured to control, cause and/or trigger device 102 to determine a tone power of a tone, for example, by summing up a plurality of received powers of the tone in the at least two sequential transmissions, e.g., as described below.

In some demonstrative embodiments, controller 124 may be configured to control, cause and/or trigger device 102 to determine the AoD from device 140, for example, based on the plurality of tone powers and a mapping of the plurality of tones to the plurality of directions, e.g., as described above.

In some demonstrative embodiments, the mapping of the plurality of tones may associate each tone of the plurality of tones with only one direction of the plurality of directions, e.g., as described above.

In some demonstrative embodiments, device 140 may be configured to transmit a single symbol, e.g., as described above, for example, using a plurality of antennas including a number, denoted $N_{tx}$, of antennas.

In one implementation, for example, if device 140 has N transmit chains associated with the N antennas, respectively, device 140 may control each antenna to transmit a different symbol, e.g., simultaneously.

In some demonstrative embodiments, for example, instead of transmitting the $N_{tx}$ symbols simultaneously, device 140 may be configured to transmit the $N_{tx}$ symbols, for example, by transmitting each symbol through a different antenna, e.g., by switching a single Tx RF chain 150 between the antennas 147.

In some demonstrative embodiments, the actual signal transmitted from each antenna may include the same symbol described above. For example, the different N signals may be transmitted at different times, e.g., sequentially.

In some demonstrative embodiments, device 102 may be configured to receive the $N_{tx}$ symbols, and to buffer each of the received symbols.

In some demonstrative embodiments, device 102 may be configured to sum the $N_{tx}$ symbols into a single symbol, for example, by simple summation of the digital values of two or more received OFDM symbols. Accordingly, a common receiver may be used at device 102.

In some demonstrative embodiments, the result of the summation of the N symbols into a single symbol by device 102 may be substantially equivalent to the result of simultaneously transmitting a single symbol from device 140, e.g., since the channel between device 102 and 140 may be assumed to be linear and time-invariant.

In some demonstrative embodiments, device 102 may be configured to estimate the AoD using the result of the summation, e.g., as described above.

In some demonstrative embodiments, device 102 may be configured to estimate the AoD as an in-place algorithm, e.g., to avoid a need for multiple buffers in device 102.

In one example, a single buffer in the size of an OFDM symbol may be sufficient, e.g., instead of multiple buffers.

In some demonstrative embodiments, device 102 may be configured to determine each received input sample, and input the sample into a buffer.

In some demonstrative embodiments, device 102 may be configured to sum an input sample with a current memory in the buffer, for example, when a new symbol arrives.

In some demonstrative embodiments, device 102 may repeat summing an input sample with a current memory in the buffer, for example, until all symbols from device 140 are received.

In some demonstrative embodiments, device 102 may not be required to have any knowledge of a number of antennas 147 and/or a number and/or which transmit chains of Tx chains 150 are being used.

In one example, it may be enough for device 102 to know only the number of symbols device 102 needs to buffer. The summation required by device 102 may remain the same, e.g., regardless of the number Tx chains 150 and/or the number of antennas 147.

Figure 6:
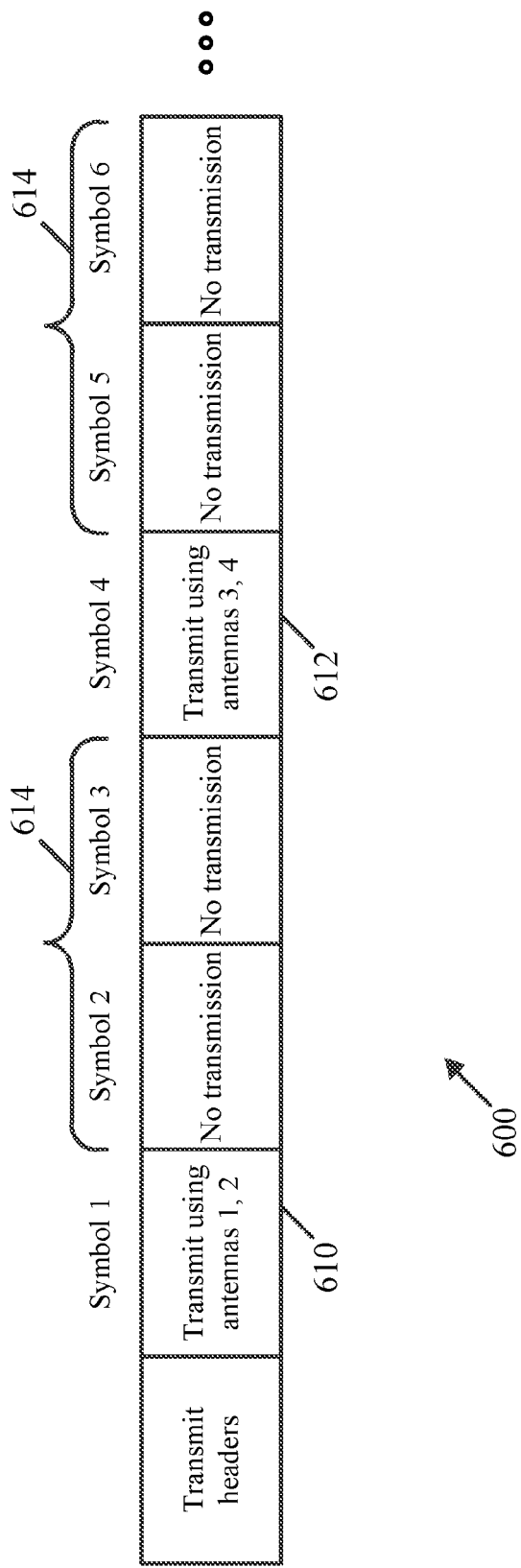
FIG. 6 is a schematic illustration of a frame transmission configured for AoD estimation, in accordance with some demonstrative embodiments.

Reference is made to FIG. 6, which schematically illustrates a frame transmission 600 configured for AoD estimation, in accordance with some demonstrative embodiments.

For example, device 140 (FIG. 1) may be configured to generate and transmit frame transmission 600, e.g., as described above.

In some demonstrative embodiments, frame transmission 600 may be transmitted by an AP having two transmit chains and more than four antennas.

In some demonstrative embodiments, as shown in FIG. 6, the two transmit chains may be used to sequentially transmit the frame via subsets of the antennas of the AP.

In some demonstrative embodiments, as shown in FIG. 6, a first symbol 610 may be transmitted using the two transmit chains via two antennas, denoted 1,2, of the AP.

In some demonstrative embodiments, as shown in FIG. 6, a second symbol 612 may be transmitted using the two transmit chains via two different antennas, denoted 3,4, of the antennas of the AP.

In some demonstrative embodiments, as shown in FIG. 6, two symbols 614, may be left empty between each switching operation between pairs of antennas, for example, to enable a device, which receives frame transmission 600, to differentiate between symbols 610 and 612.

Figure 7:
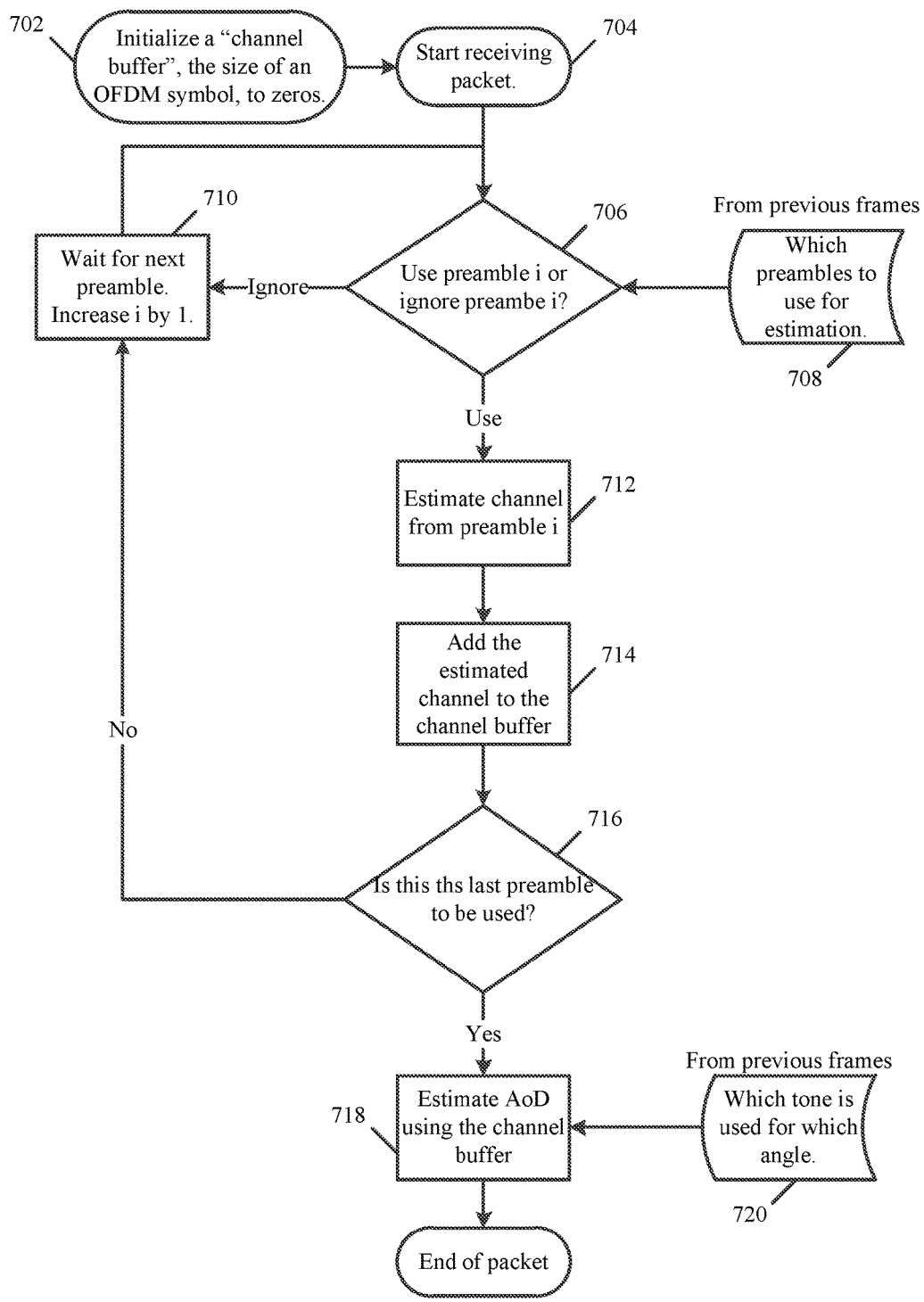
FIG. 7 is a schematic flow-chart illustration of a method of AoD estimation, in accordance with some demonstrative embodiments.

Reference is made to FIG. 7, which schematically illustrates a method of AoD estimation, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1) and/or device 140 (FIG. 1); a controller, e.g., controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 702, the method may include initializing a buffer, e.g., having a size of an OFDM symbol. For example, device 102 (FIG. 1) may initialize a buffer having the size of the OFDM symbol.

As indicated at block 704, the method may include receiving a symbol from an AP. For example, device 102 (FIG. 1) may receive a transmission of symbol from device 140 (FIG. 1), e.g., as described above.

As indicated at block 706, the method may include determining whether or not to use a preamble of the symbol for the AoD estimation. For example, device 102 (FIG. 1) may determine whether or not to use the received symbol from AP 140 (FIG. 1) for AoD estimation, e.g., as described above.

As indicated at block 708, the method may include determining whether or not to use the symbol for the AoD estimation, for example, based on information defining which symbols are to be used for the AoD estimation. For example, device 102 (FIG. 1) may receive the announcement frame from device 140 (FIG. 1) including the indication of the symbols to be used for AoD estimation, e.g., as described above.

As indicated at block 710, the method may include waiting for a next symbol, e.g., if the received symbol is not to be used for the AoD estimation. For example, device 102 (FIG. 1) may wait for the next symbol, for example, if the received symbol includes the non-valid tones, e.g., as described above.

As indicated at block 712, the method may include estimating a channel of a symbol. For example, device 102 (FIG. 1) may determine tone powers of the received symbol, e.g., as described above.

As indicated at block 714, the method may include summing a channel of the symbol and storing the channel in the buffer. For example, device 102 (FIG. 1) may add to the buffer the plurality of tone powers of the received symbol, e.g., as described above.

As indicated at block 716, the method may include determining whether or not the symbol is a last symbol to be used for the AoD estimation. For example, device 102 (FIG. 1) may determine if the transmission is the last transmission of the sequence of transmissions for AoD estimation, e.g., as described above.

As indicated at block 718, the method may include estimating the AoD based on data in the buffer, and mapping information indicating the mapping of the plurality of tones to a plurality of directions. For example, device 102 (FIG. 1) may estimate the AoD of device 140 (FIG. 1), based on the plurality of tone powers and the mapping of the plurality of tones to the plurality of directions, e.g., as described above.

As indicated at block 720, the method may include receiving the mapping information from the AP. For example, device 102 (FIG. 1) may receive the announcement frame including the mapping information from device 140 (FIG. 1), e.g., as described above.

Figure 8:
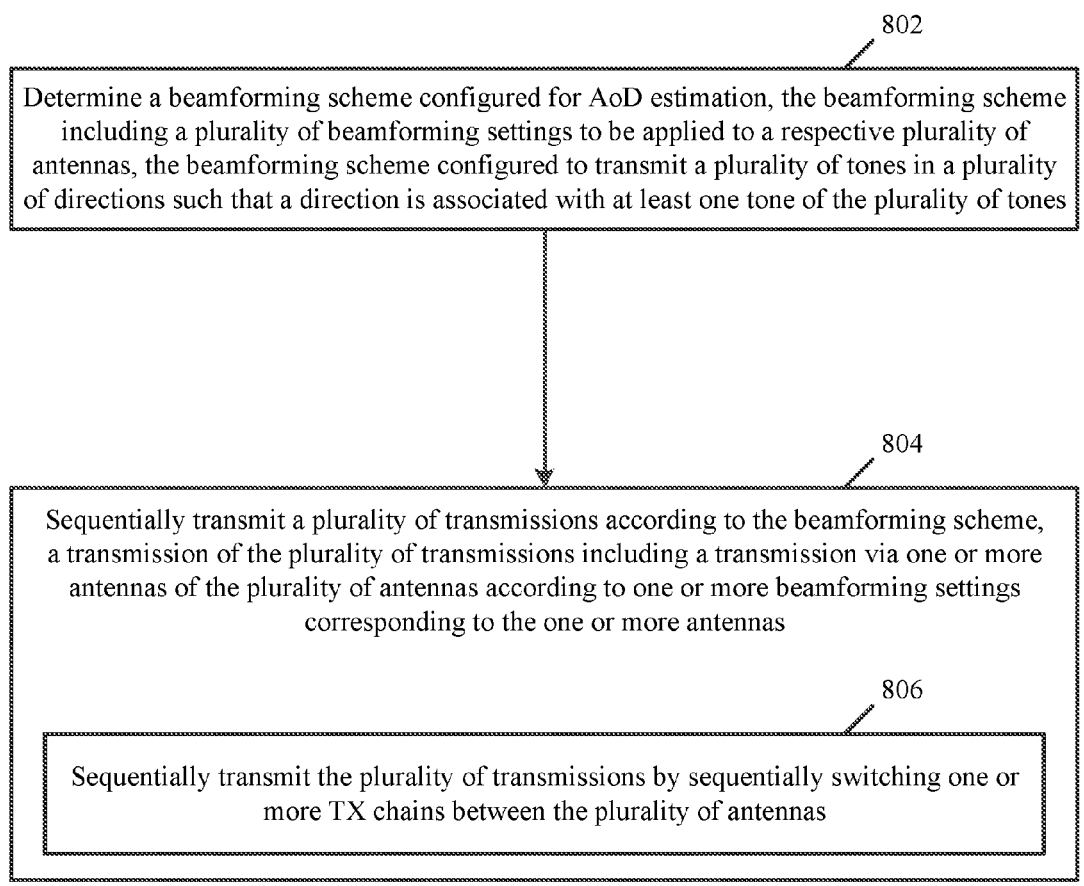
FIG. 8 is a schematic flow-chart illustration of a method of AoD estimation, in accordance with some demonstrative embodiments.

Reference is made to FIG. 8, which schematically illustrates a method of AoD estimation, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1) and/or device 140 (FIG. 1); a controller, e.g., controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 802, the method may include determining a beamforming scheme configured for AoD estimation, the beamforming scheme including a plurality of beamforming settings to be applied to a respective plurality of antennas, the beamforming scheme configured to transmit a plurality of tones in a plurality of directions, e.g., such that a direction is associated with at least one tone of the plurality of tones. For example, device 140 (FIG. 1) may determine the beamforming scheme for the AoD estimation, e.g., as described above.

As indicated at block 804, the method may include sequentially transmitting a plurality of transmissions according to the beamforming scheme, a transmission of the plurality of transmissions including a transmission via one or more antennas of the plurality of antennas according to one or more beamforming settings corresponding to the one or more antennas. For example, device 140 (FIG. 1) may sequentially transmit the plurality of transmissions according to the beamforming scheme, e.g., as described above.

As indicated at block 806, sequentially transmitting the plurality of transmissions according to the beamforming scheme may include sequentially transmitting the plurality of transmissions by sequentially switching one or more Tx chains between the plurality of antennas. For example, device 140 (FIG. 1) may sequentially transmit the plurality of transmissions by sequentially switching the one or more Tx chains 150 (FIG. 1) between the plurality of antennas 147 (FIG. 1), e.g., as described above.

Figure 9:
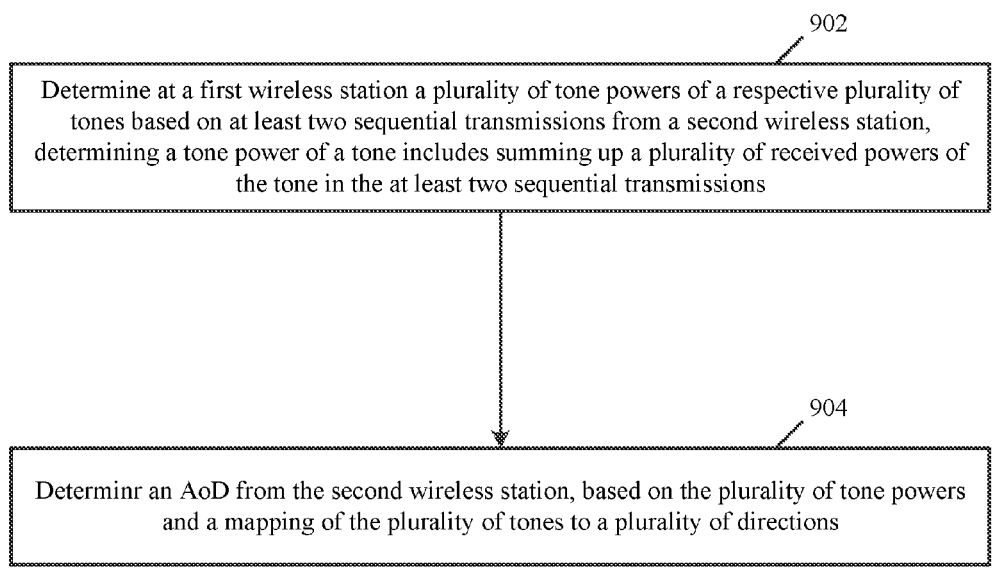
FIG. 9 is a schematic flow-chart illustration of a method of AoD estimation, in accordance with some demonstrative embodiments.

Reference is made to FIG. 9, which schematically illustrates a method of AoD estimation, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1) and/or device 140 (FIG. 1); a controller, e.g., controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); and/or a message processor, e.g., message processor 128 (FIG. 1) and/or message processor 158 (FIG. 1).

As indicated at block 902, the method may include determining at a first wireless station a plurality of tone powers of a respective plurality of tones based on at least two sequential transmissions from a second wireless station. For example, determining a tone power of a tone may include summing up a plurality of received powers of the tone in the at least two sequential transmissions. For example, device 102 (FIG. 1) may determine the plurality of tone powers of the respective plurality of tones based on at least two sequential transmissions of the plurality of transmissions from device 140 (FIG. 1), e.g., as described above.

As indicated at block 904, the method may include determining an AoD from the second wireless station, based on the plurality of tone powers and a mapping of the plurality of tones to a plurality of directions. For example, device 102 (FIG. 1) may determine the AoD from device 140 (FIG. 1), based, for example, on the plurality of tone powers and the mapping of the plurality of tones to the plurality of directions, e.g., as described above.

Figure 10:
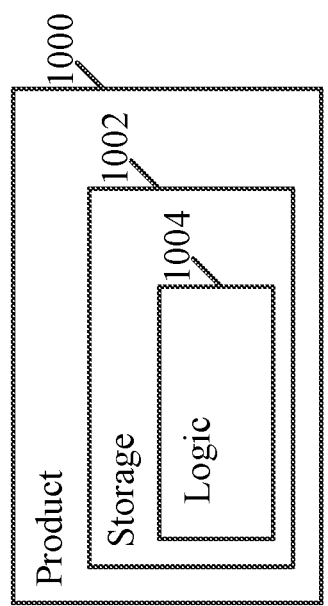
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), and/or to perform one or more operations described above with respect to FIGS. 1, 2, 3, 4, 5, 6, 7, 8, and/or 9, and/or one or more operations described herein. The phrase "non-transitory machine-readable medium" is directed to include all computer-readable media, with the sole exception being a transitory propagating signal.

In some demonstrative embodiments, product 1000 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a wireless station to determine a beamforming scheme configured for Angle of Departure (AoD) estimation, the beamforming scheme comprising a plurality of beamforming settings to be applied to a respective plurality of antennas, the beamforming scheme configured to transmit a plurality of tones in a plurality of directions such that a direction is associated with at least one tone of the plurality of tones; and sequentially transmit a plurality of transmissions according to the beamforming scheme, a transmission of the plurality of transmissions comprising a transmission via one or more antennas of the plurality of antennas according to one or more beamforming settings corresponding to the one or more antennas.

Example 2 includes the subject matter of Example 1, and optionally, wherein the apparatus is configured to cause the wireless station to transmit a first transmission of the plurality of transmissions via one or more first antennas of the plurality of antennas according to one or more first beamforming settings of the plurality of beamforming settings, and, subsequent to the first transmission, to transmit a second transmission of the plurality of transmissions via one or more second antennas of the plurality of antennas according to one or more second beamforming settings of the plurality of beamforming settings.

Example 3 includes the subject matter of Example 1 or 2, and optionally, wherein the apparatus is configured to cause the wireless station to sequentially transmit the plurality of transmissions by sequentially switching one or more transmit (TX) chains between the plurality of antennas.

Example 4 includes the subject matter of Example 3, and optionally, wherein the apparatus is configured to cause the wireless station to transmit a first transmission of the plurality of transmissions via the one or more Tx chains and one or more first antennas of the plurality of antennas, and, subsequent to the first transmission, to switch the one or more Tx chains to one or more second antennas of the plurality of antennas to transmit a second transmission of the plurality of transmissions via the one or more second antennas.

Example 5 includes the subject matter of any one of Examples 1-4, and optionally, wherein the apparatus is configured to cause the wireless station to sequentially transmit the plurality of transmissions by sequentially switching two or more transmit (TX) chains between the plurality of antennas.

Example 6 includes the subject matter of Example 5, and optionally, wherein the apparatus is configured to cause the wireless station to transmit a first transmission of the plurality of transmissions via the two or more Tx chains and two or more first antennas of the plurality of antennas, and, subsequent to the first transmission, to switch the two or more Tx chains to two or more second antennas of the plurality of antennas to transmit a second transmission of the plurality of transmissions via the two or more second antennas.

Example 7 includes the subject matter of Example 1, and optionally, wherein the apparatus is configured to cause the wireless station to sequentially switch a single transmit (TX) chain between the plurality of antennas to transmit each transmission of the plurality of transmissions via a respective antenna of the plurality of antennas.

Example 8 includes the subject matter of any one of Examples 1-7, and optionally, wherein the beamforming scheme is configured to transmit each tone of the plurality of tones in only one direction of the plurality of directions.

Example 9 includes the subject matter of any one of Examples 1-7, and optionally, wherein the beamforming scheme is configured to transmit each tone in a respective direction of the plurality of directions.

Example 10 includes the subject matter of any one of Examples 1-7, and optionally, wherein the beamforming scheme is configured to transmit two or more tones in a same direction of the plurality of directions.

Example 11 includes the subject matter of any one of Examples 1-10, and optionally, wherein the plurality of tones comprises a plurality of Orthogonal Frequency-Division Multiplexing (OFDM) tones of an OFDM symbol.

Example 12 includes the subject matter of any one of Examples 1-11, and optionally, wherein the apparatus is configured to cause the wireless station to transmit one or more non-valid tones between a first and second consecutive transmissions of the plurality of transmissions.

Example 13 includes the subject matter of Example 12, and optionally, wherein the apparatus is configured to cause the wireless station to transmit an announcement frame comprising a number of the one or more non-valid tones.

Example 14 includes the subject matter of any one of Examples 1-13, and optionally, wherein the apparatus is configured to cause the wireless station to transmit an announcement frame comprising information indicating an association between the plurality of directions and the plurality of tones.

Example 15 includes the subject matter of any one of Examples 1-14, and optionally, wherein the direction comprises an azimuth angle, an elevation angle, or a combination thereof.

Example 16 includes the subject matter of any one of Examples 1-15, and optionally, wherein the plurality of directions covers an angle of 360 degrees.

Example 17 includes the subject matter of any one of Examples 1-16, and optionally, wherein the wireless station is an Access point (AP).

Example 18 includes the subject matter of any one of Examples 1-17, and optionally, comprising the plurality of antennas, a memory and a processor.

Example 19 includes a system of wireless communication comprising a wireless station, the wireless station comprising a plurality of antennas; a memory; a processor; and a controller configured to cause the wireless station to determine a beamforming scheme configured for Angle of Departure (AoD) estimation, the beamforming scheme comprising a plurality of beamforming settings to be applied to a respective plurality of antennas, the beamforming scheme configured to transmit a plurality of tones in a plurality of directions such that a direction is associated with at least one tone of the plurality of tones; and sequentially transmit a plurality of transmissions according to the beamforming scheme, a transmission of the plurality of transmissions comprising a transmission via one or more antennas of the plurality of antennas according to one or more beamforming settings corresponding to the one or more antennas.

Example 20 includes the subject matter of Example 19, and optionally, wherein the controller is configured to cause the wireless station to transmit a first transmission of the plurality of transmissions via one or more first antennas of the plurality of antennas according to one or more first beamforming settings of the plurality of beamforming settings, and, subsequent to the first transmission, to transmit a second transmission of the plurality of transmissions via one or more second antennas of the plurality of antennas according to one or more second beamforming settings of the plurality of beamforming settings.

Example 21 includes the subject matter of Example 19 or 20, and optionally, wherein the controller is configured to cause the wireless station to sequentially transmit the plurality of transmissions by sequentially switching one or more transmit (TX) chains between the plurality of antennas.

Example 22 includes the subject matter of Example 21, and optionally, wherein the controller is configured to cause the wireless station to transmit a first transmission of the plurality of transmissions via the one or more Tx chains and one or more first antennas of the plurality of antennas, and, subsequent to the first transmission, to switch the one or more Tx chains to one or more second antennas of the plurality of antennas to transmit a second transmission of the plurality of transmissions via the one or more second antennas.

Example 23 includes the subject matter of any one of Examples 19-22, and optionally, wherein the controller is configured to cause the wireless station to sequentially transmit the plurality of transmissions by sequentially switching two or more transmit (TX) chains between the plurality of antennas.

Example 24 includes the subject matter of Example 23, and optionally, wherein the controller is configured to cause the wireless station to transmit a first transmission of the plurality of transmissions via the two or more Tx chains and two or more first antennas of the plurality of antennas, and, subsequent to the first transmission, to switch the two or more Tx chains to two or more second antennas of the plurality of antennas to transmit a second transmission of the plurality of transmissions via the two or more second antennas.

Example 25 includes the subject matter of Example 19, and optionally, wherein the controller is configured to cause the wireless station to sequentially switch a single transmit (TX) chain between the plurality of antennas to transmit each transmission of the plurality of transmissions via a respective antenna of the plurality of antennas.

Example 26 includes the subject matter of any one of Examples 19-25, and optionally, wherein the beamforming scheme is configured to transmit each tone of the plurality of tones in only one direction of the plurality of directions.

Example 27 includes the subject matter of any one of Examples 19-25, and optionally, wherein the beamforming scheme is configured to transmit each tone in a respective direction of the plurality of directions.

Example 28 includes the subject matter of any one of Examples 19-25, and optionally, wherein the beamforming scheme is configured to transmit two or more tones in a same direction of the plurality of directions.

Example 29 includes the subject matter of any one of Examples 19-28, and optionally, wherein the plurality of tones comprises a plurality of Orthogonal Frequency-Division Multiplexing (OFDM) tones of an OFDM symbol.

Example 30 includes the subject matter of any one of Examples 19-29, and optionally, wherein the controller is configured to cause the wireless station to transmit one or more non-valid tones between a first and second consecutive transmissions of the plurality of transmissions.

Example 31 includes the subject matter of Example 30, and optionally, wherein the controller is configured to cause the wireless station to transmit an announcement frame comprising a number of the one or more non-valid tones.

Example 32 includes the subject matter of any one of Examples 19-31, and optionally, wherein the controller is configured to cause the wireless station to transmit an announcement frame comprising information indicating an association between the plurality of directions and the plurality of tones.

Example 33 includes the subject matter of any one of Examples 19-32, and optionally, wherein the direction comprises an azimuth angle, an elevation angle, or a combination thereof.

Example 34 includes the subject matter of any one of Examples 19-33, and optionally, wherein the plurality of directions covers an angle of 360 degrees.

Example 35 includes the subject matter of any one of Examples 19-34, and optionally, wherein the wireless station is an Access point (AP).

Example 36 includes a method to be performed at a wireless station, the method comprising determining a beamforming scheme configured for Angle of Departure (AoD) estimation, the beamforming scheme comprising a plurality of beamforming settings to be applied to a respective plurality of antennas, the beamforming scheme configured to transmit a plurality of tones in a plurality of directions such that a direction is associated with at least one tone of the plurality of tones; and sequentially transmitting a plurality of transmissions according to the beamforming scheme, a transmission of the plurality of transmissions comprising a transmission via one or more antennas of the plurality of antennas according to one or more beamforming settings corresponding to the one or more antennas.

Example 37 includes the subject matter of Example 36, and optionally, comprising transmitting a first transmission of the plurality of transmissions via one or more first antennas of the plurality of antennas according to one or more first beamforming settings of the plurality of beamforming settings, and, subsequent to the first transmission, transmitting a second transmission of the plurality of transmissions via one or more second antennas of the plurality of antennas according to one or more second beamforming settings of the plurality of beamforming settings.

Example 38 includes the subject matter of Example 36 or 37, and optionally, comprising sequentially transmitting the plurality of transmissions by sequentially switching one or more transmit (TX) chains between the plurality of antennas.

Example 39 includes the subject matter of Example 38, and optionally, comprising transmitting a first transmission of the plurality of transmissions via the one or more Tx chains and one or more first antennas of the plurality of antennas, and, subsequent to the first transmission, switching the one or more Tx chains to one or more second antennas of the plurality of antennas to transmit a second transmission of the plurality of transmissions via the one or more second antennas.

Example 40 includes the subject matter of any one of Examples 36-39, and optionally, comprising sequentially transmitting the plurality of transmissions by sequentially switching two or more transmit (TX) chains between the plurality of antennas.

Example 41 includes the subject matter of Example 40, and optionally, comprising transmitting a first transmission of the plurality of transmissions via the two or more Tx chains and two or more first antennas of the plurality of antennas, and, subsequent to the first transmission, switching the two or more Tx chains to two or more second antennas of the plurality of antennas to transmit a second transmission of the plurality of transmissions via the two or more second antennas.

Example 42 includes the subject matter of Example 36, and optionally, comprising sequentially switching a single transmit (TX) chain between the plurality of antennas to transmit each transmission of the plurality of transmissions via a respective antenna of the plurality of antennas.

Example 43 includes the subject matter of any one of Examples 36-42, and optionally, wherein the beamforming scheme is configured to transmit each tone of the plurality of tones in only one direction of the plurality of directions.

Example 44 includes the subject matter of any one of Examples 36-42, and optionally, wherein the beamforming scheme is configured to transmit each tone in a respective direction of the plurality of directions.

Example 45 includes the subject matter of any one of Examples 36-42, and optionally, wherein the beamforming scheme is configured to transmit two or more tones in a same direction of the plurality of directions.

Example 46 includes the subject matter of any one of Examples 36-45, and optionally, wherein the plurality of tones comprises a plurality of Orthogonal Frequency-Division Multiplexing (OFDM) tones of an OFDM symbol.

Example 47 includes the subject matter of any one of Examples 36-46, and optionally, comprising transmitting one or more non-valid tones between a first and second consecutive transmissions of the plurality of transmissions.

Example 48 includes the subject matter of Example 47, and optionally, comprising transmitting an announcement frame comprising a number of the one or more non-valid tones.

Example 49 includes the subject matter of any one of Examples 36-48, and optionally, comprising transmitting an announcement frame comprising information indicating an association between the plurality of directions and the plurality of tones.

Example 50 includes the subject matter of any one of Examples 36-49, and optionally, wherein the direction comprises an azimuth angle, an elevation angle, or a combination thereof.

Example 51 includes the subject matter of any one of Examples 36-50, and optionally, wherein the plurality of directions covers an angle of 360 degrees.

Example 52 includes the subject matter of any one of Examples 36-51, and optionally, wherein the wireless station is an Access point (AP).

Example 53 includes a product comprising one or more tangible computer-readable non-transitory storage media comprising computer-executable instructions operable to, when executed by at least one computer processor, enable the at least one computer processor to implement operations at a wireless station, the operations comprising determining a beamforming scheme configured for Angle of Departure (AoD) estimation, the beamforming scheme comprising a plurality of beamforming settings to be applied to a respective plurality of antennas, the beamforming scheme configured to transmit a plurality of tones in a plurality of directions such that a direction is associated with at least one tone of the plurality of tones; and sequentially transmitting a plurality of transmissions according to the beamforming scheme, a transmission of the plurality of transmissions comprising a transmission via one or more antennas of the plurality of antennas according to one or more beamforming settings corresponding to the one or more antennas.

Example 54 includes the subject matter of Example 53, and optionally, wherein the operations comprise transmitting a first transmission of the plurality of transmissions via one or more first antennas of the plurality of antennas according to one or more first beamforming settings of the plurality of beamforming settings, and, subsequent to the first transmission, transmitting a second transmission of the plurality of transmissions via one or more second antennas of the plurality of antennas according to one or more second beamforming settings of the plurality of beamforming settings.

Example 55 includes the subject matter of Example 53 or 54, and optionally, wherein the operations comprise sequentially transmitting the plurality of transmissions by sequentially switching one or more transmit (TX) chains between the plurality of antennas.

Example 56 includes the subject matter of Example 55, and optionally, wherein the operations comprise transmitting a first transmission of the plurality of transmissions via the one or more Tx chains and one or more first antennas of the plurality of antennas, and, subsequent to the first transmission, switching the one or more Tx chains to one or more second antennas of the plurality of antennas to transmit a second transmission of the plurality of transmissions via the one or more second antennas.

Example 57 includes the subject matter of any one of Examples 53-56, and optionally, wherein the operations comprise sequentially transmitting the plurality of transmissions by sequentially switching two or more transmit (TX) chains between the plurality of antennas.

Example 58 includes the subject matter of Example 57, and optionally, wherein the operations comprise transmitting a first transmission of the plurality of transmissions via the two or more Tx chains and two or more first antennas of the plurality of antennas, and, subsequent to the first transmission, switching the two or more Tx chains to two or more second antennas of the plurality of antennas to transmit a second transmission of the plurality of transmissions via the two or more second antennas.

Example 59 includes the subject matter of Example 53, and optionally, wherein the operations comprise sequentially switching a single transmit (TX) chain between the plurality of antennas to transmit each transmission of the plurality of transmissions via a respective antenna of the plurality of antennas.

Example 60 includes the subject matter of any one of Examples 53-59, and optionally, wherein the beamforming scheme is configured to transmit each tone of the plurality of tones in only one direction of the plurality of directions.

Example 61 includes the subject matter of any one of Examples 53-59, and optionally, wherein the beamforming scheme is configured to transmit each tone in a respective direction of the plurality of directions.

Example 62 includes the subject matter of any one of Examples 53-59, and optionally, wherein the beamforming scheme is configured to transmit two or more tones in a same direction of the plurality of directions.

Example 63 includes the subject matter of any one of Examples 53-62, and optionally, wherein the plurality of tones comprises a plurality of Orthogonal Frequency-Division Multiplexing (OFDM) tones of an OFDM symbol.

Example 64 includes the subject matter of any one of Examples 53-63, and optionally, wherein the operations comprise transmitting one or more non-valid tones between a first and second consecutive transmissions of the plurality of transmissions.

Example 65 includes the subject matter of Example 64, and optionally, wherein the operations comprise transmitting an announcement frame comprising a number of the one or more non-valid tones.

Example 66 includes the subject matter of any one of Examples 53-65, and optionally, wherein the operations comprise transmitting an announcement frame comprising information indicating an association between the plurality of directions and the plurality of tones.

Example 67 includes the subject matter of any one of Examples 53-66, and optionally, wherein the direction comprises an azimuth angle, an elevation angle, or a combination thereof.

Example 68 includes the subject matter of any one of Examples 53-67, and optionally, wherein the plurality of directions covers an angle of 360 degrees.

Example 69 includes the subject matter of any one of Examples 53-68, and optionally, wherein the wireless station is an Access point (AP).

Example 70 includes an apparatus of wireless communication by a first wireless station, the apparatus comprising means for determining a beamforming scheme configured for Angle of Departure (AoD) estimation, the beamforming scheme comprising a plurality of beamforming settings to be applied to a respective plurality of antennas, the beamforming scheme configured to transmit a plurality of tones in a plurality of directions such that a direction is associated with at least one tone of the plurality of tones; and means for sequentially transmitting a plurality of transmissions according to the beamforming scheme, a transmission of the plurality of transmissions comprising a transmission via one or more antennas of the plurality of antennas according to one or more beamforming settings corresponding to the one or more antennas.

Example 71 includes the subject matter of Example 70, and optionally, comprising means for transmitting a first transmission of the plurality of transmissions via one or more first antennas of the plurality of antennas according to one or more first beamforming settings of the plurality of beamforming settings, and, subsequent to the first transmission, transmitting a second transmission of the plurality of transmissions via one or more second antennas of the plurality of antennas according to one or more second beamforming settings of the plurality of beamforming settings.

Example 72 includes the subject matter of Example 70 or 71, and optionally, comprising means for sequentially transmitting the plurality of transmissions by sequentially switching one or more transmit (TX) chains between the plurality of antennas.

Example 73 includes the subject matter of Example 72, and optionally, comprising means for transmitting a first transmission of the plurality of transmissions via the one or more Tx chains and one or more first antennas of the plurality of antennas, and, subsequent to the first transmission, switching the one or more Tx chains to one or more second antennas of the plurality of antennas to transmit a second transmission of the plurality of transmissions via the one or more second antennas.

Example 74 includes the subject matter of any one of Examples 70-73, and optionally, comprising means for sequentially transmitting the plurality of transmissions by sequentially switching two or more transmit (TX) chains between the plurality of antennas.

Example 75 includes the subject matter of Example 74, and optionally, comprising means for transmitting a first transmission of the plurality of transmissions via the two or more Tx chains and two or more first antennas of the plurality of antennas, and, subsequent to the first transmission, switching the two or more Tx chains to two or more second antennas of the plurality of antennas to transmit a second transmission of the plurality of transmissions via the two or more second antennas.

Example 76 includes the subject matter of Example 70, and optionally, comprising means for sequentially switching a single transmit (TX) chain between the plurality of antennas to transmit each transmission of the plurality of transmissions via a respective antenna of the plurality of antennas.

Example 77 includes the subject matter of any one of Examples 70-76, and optionally, wherein the beamforming scheme is configured to transmit each tone of the plurality of tones in only one direction of the plurality of directions.

Example 78 includes the subject matter of any one of Examples 70-76, and optionally, wherein the beamforming scheme is configured to transmit each tone in a respective direction of the plurality of directions.

Example 79 includes the subject matter of any one of Examples 70-76, and optionally, wherein the beamforming scheme is configured to transmit two or more tones in a same direction of the plurality of directions.

Example 80 includes the subject matter of any one of Examples 70-79, and optionally, wherein the plurality of tones comprises a plurality of Orthogonal Frequency-Division Multiplexing (OFDM) tones of an OFDM symbol.

Example 81 includes the subject matter of any one of Examples 70-80, and optionally, comprising means for transmitting one or more non-valid tones between a first and second consecutive transmissions of the plurality of transmissions.

Example 82 includes the subject matter of Example 81, and optionally, comprising means for transmitting an announcement frame comprising a number of the one or more non-valid tones.

Example 83 includes the subject matter of any one of Examples 70-82, and optionally, comprising means for transmitting an announcement frame comprising information indicating an association between the plurality of directions and the plurality of tones.

Example 84 includes the subject matter of any one of Examples 70-83, and optionally, wherein the direction comprises an azimuth angle, an elevation angle, or a combination thereof.

Example 85 includes the subject matter of any one of Examples 70-84, and optionally, wherein the plurality of directions covers an angle of 360 degrees.

Example 86 includes the subject matter of any one of Examples 70-85, and optionally, wherein the wireless station is an Access point (AP).

Example 87 includes an apparatus comprising circuitry and logic configured to cause a first wireless station to determine a plurality of tone powers of a respective plurality of tones based on at least two sequential transmissions from a second wireless station, determining a tone power of a tone comprises summing up a plurality of received powers of the tone in the at least two sequential transmissions; and determine an Angle of Departure (AoD) from the second wireless station, based on the plurality of tone powers and a mapping of the plurality of tones to a plurality of directions.

Example 88 includes the subject matter of Example 87, and optionally, wherein the mapping of the plurality of tones associates each tone of the plurality of tones with only one direction of the plurality of directions.

Example 89 includes the subject matter of Example 87, and optionally, wherein the mapping of the plurality of tones associates each tone with a respective direction of the plurality of directions.

Example 90 includes the subject matter of Example 87, and optionally, wherein the mapping of the plurality of tones associates two or more tones with a same direction of the plurality of directions.

Example 91 includes the subject matter of any one of Examples 87-90, and optionally, wherein a direction of the plurality of directions comprises an azimuth angle, an elevation angle, or a combination thereof.

Example 92 includes the subject matter of any one of Examples 87-91, and optionally, wherein the plurality of tones comprises a plurality of Orthogonal Frequency-Division Multiplexing (OFDM) tones of an OFDM symbol.

Example 93 includes the subject matter of any one of Examples 87-92, and optionally, wherein the apparatus is configured to cause the first wireless station to differentiate between the at least two sequential transmissions from the second wireless station based on one or more non-valid tones received between the at least two sequential transmissions.

Example 94 includes the subject matter of Example 93, and optionally, wherein the apparatus is configured to cause the first wireless station to process an announcement frame from the second wireless station, the announcement frame comprising an indication of a number of the one or more non-valid tones.

Example 95 includes the subject matter of any one of Examples 87-94 configured to cause the first wireless station to process an announcement frame from the second wireless station, the announcement frame comprising information indicating the mapping of the plurality of tones to the plurality of directions.

Example 96 includes the subject matter of any one of Examples 87-95, and optionally, wherein the plurality of directions covers an angle of 360 degrees.

Example 97 includes the subject matter of any one of Examples 87-96, and optionally, wherein the apparatus is configured to cause the first wireless station to estimate a location of the first wireless station based at least on the AoD from the second wireless station.

Example 98 includes the subject matter of any one of Examples 87-97, and optionally, wherein the second wireless station is an Access point (AP).

Example 99 includes the subject matter of any one of Examples 87-98, and optionally, comprising one or more antennas, a memory and a processor.

Example 100 includes a system of wireless communication comprising a first wireless station, the first wireless station comprising one or more antennas; a memory; a processor; and a controller configured to cause the first wireless station to determine a plurality of tone powers of a respective plurality of tones based on at least two sequential transmissions from a second wireless station, determining a tone power of a tone comprises summing up a plurality of received powers of the tone in the at least two sequential transmissions; and determine an Angle of Departure (AoD) from the second wireless station, based on the plurality of tone powers and a mapping of the plurality of tones to a plurality of directions.

Example 101 includes the subject matter of Example 100, and optionally, wherein the mapping of the plurality of tones associates each tone of the plurality of tones with only one direction of the plurality of directions.

Example 102 includes the subject matter of Example 100, and optionally, wherein the mapping of the plurality of tones associates each tone with a respective direction of the plurality of directions.

Example 103 includes the subject matter of Example 100, and optionally, wherein the mapping of the plurality of tones associates two or more tones with a same direction of the plurality of directions.

Example 104 includes the subject matter of any one of Examples 100-103, and optionally, wherein a direction of the plurality of directions comprises an azimuth angle, an elevation angle, or a combination thereof.

Example 105 includes the subject matter of any one of Examples 100-104, and optionally, wherein the plurality of tones comprises a plurality of Orthogonal Frequency-Division Multiplexing (OFDM) tones of an OFDM symbol.

Example 106 includes the subject matter of any one of Examples 100-105, and optionally, wherein the controller is configured to cause the first wireless station to differentiate between the at least two sequential transmissions from the second wireless station based on one or more non-valid tones received between the at least two sequential transmissions.

Example 107 includes the subject matter of Example 106, and optionally, wherein the controller is configured to cause the first wireless station to process an announcement frame from the second wireless station, the announcement frame comprising an indication of a number of the one or more non-valid tones.

Example 108 includes the subject matter of any one of Examples 100-107, and optionally, wherein the controller is configured to cause the first wireless station to process an announcement frame from the second wireless station, the announcement frame comprising information indicating the mapping of the plurality of tones to the plurality of directions.

Example 109 includes the subject matter of any one of Examples 100-108, and optionally, wherein the plurality of directions covers an angle of 360 degrees.

Example 110 includes the subject matter of any one of Examples 100-109, and optionally, wherein the controller is configured to cause the first wireless station to estimate a location of the first wireless station based at least on the AoD from the second wireless station.

Example 111 includes the subject matter of any one of Examples 100-110, and optionally, wherein the second wireless station is an Access point (AP).

Example 112 includes a method to be performed at a first wireless station, the method comprising determining a plurality of tone powers of a respective plurality of tones based on at least two sequential transmissions from a second wireless station, determining a tone power of a tone comprises summing up a plurality of received powers of the tone in the at least two sequential transmissions; and determining an Angle of Departure (AoD) from the second wireless station, based on the plurality of tone powers and a mapping of the plurality of tones to a plurality of directions.

Example 113 includes the subject matter of Example 112, and optionally, wherein the mapping of the plurality of tones associates each tone of the plurality of tones with only one direction of the plurality of directions.

Example 114 includes the subject matter of Example 112, and optionally, wherein the mapping of the plurality of tones associates each tone with a respective direction of the plurality of directions.

Example 115 includes the subject matter of Example 112, and optionally, wherein the mapping of the plurality of tones associates two or more tones with a same direction of the plurality of directions.

Example 116 includes the subject matter of any one of Examples 112-115, and optionally, wherein a direction of the plurality of directions comprises an azimuth angle, an elevation angle, or a combination thereof.

Example 117 includes the subject matter of any one of Examples 112-116, and optionally, wherein the plurality of tones comprises a plurality of Orthogonal Frequency-Division Multiplexing (OFDM) tones of an OFDM symbol.

Example 118 includes the subject matter of any one of Examples 112-117, and optionally, comprising differentiating between the at least two sequential transmissions from the second wireless station based on one or more non-valid tones received between the at least two sequential transmissions.

Example 119 includes the subject matter of Example 118, and optionally, comprising processing an announcement frame from the second wireless station, the announcement frame comprising an indication of a number of the one or more non-valid tones.

Example 120 includes the subject matter of any one of Examples 112-119, and optionally, comprising processing an announcement frame from the second wireless station, the announcement frame comprising information indicating the mapping of the plurality of tones to the plurality of directions.

Example 121 includes the subject matter of any one of Examples 112-120, and optionally, wherein the plurality of directions covers an angle of 360 degrees.

Example 122 includes the subject matter of any one of Examples 112-121, and optionally, comprising estimating a location of the first wireless station based at least on the AoD from the second wireless station.

Example 123 includes the subject matter of any one of Examples 112-122, and optionally, wherein the second wireless station is an Access point (AP).

Example 124 includes a product including one or more tangible computer-readable non-transitory storage media comprising computer-executable instructions operable to, when executed by at least one computer processor, enable the at least one computer processor to implement operations at a first wireless station, the operations comprising determining a plurality of tone powers of a respective plurality of tones based on at least two sequential transmissions from a second wireless station, determining a tone power of a tone comprises summing up a plurality of received powers of the tone in the at least two sequential transmissions; and determining an Angle of Departure (AoD) from the second wireless station, based on the plurality of tone powers and a mapping of the plurality of tones to a plurality of directions.

Example 125 includes the subject matter of Example 124, and optionally, wherein the mapping of the plurality of tones associates each tone of the plurality of tones with only one direction of the plurality of directions.

Example 126 includes the subject matter of Example 124, and optionally, wherein the mapping of the plurality of tones associates each tone with a respective direction of the plurality of directions.

Example 127 includes the subject matter of Example 124, and optionally, wherein the mapping of the plurality of tones associates two or more tones with a same direction of the plurality of directions.

Example 128 includes the subject matter of any one of Examples 124-127, and optionally, wherein a direction of the plurality of directions comprises an azimuth angle, an elevation angle, or a combination thereof.

Example 129 includes the subject matter of any one of Examples 124-128, and optionally, wherein the plurality of tones comprises a plurality of Orthogonal Frequency-Division Multiplexing (OFDM) tones of an OFDM symbol.

Example 130 includes the subject matter of any one of Examples 124-129, and optionally, wherein the operations comprise differentiating between the at least two sequential transmissions from the second wireless station based on one or more non-valid tones received between the at least two sequential transmissions.

Example 131 includes the subject matter of Example 130, and optionally, wherein the operations comprise processing an announcement frame from the second wireless station, the announcement frame comprising an indication of a number of the one or more non-valid tones.

Example 132 includes the subject matter of any one of Examples 124-131, and optionally, wherein the operations comprise processing an announcement frame from the second wireless station, the announcement frame comprising information indicating the mapping of the plurality of tones to the plurality of directions.

Example 133 includes the subject matter of any one of Examples 124-132, and optionally, wherein the plurality of directions covers an angle of 360 degrees.

Example 134 includes the subject matter of any one of Examples 124-133, and optionally, wherein the operations comprise estimating a location of the first wireless station based at least on the AoD from the second wireless station.

Example 135 includes the subject matter of any one of Examples 124-134, and optionally, wherein the second wireless station is an Access point (AP).

Example 136 includes an apparatus of wireless communication by a first wireless station, the apparatus comprising means for determining a plurality of tone powers of a respective plurality of tones based on at least two sequential transmissions from a second wireless station, determining a tone power of a tone comprises summing up a plurality of received powers of the tone in the at least two sequential transmissions; and means for determining an Angle of Departure (AoD) from the second wireless station, based on the plurality of tone powers and a mapping of the plurality of tones to a plurality of directions.

Example 137 includes the subject matter of Example 136, and optionally, wherein the mapping of the plurality of tones associates each tone of the plurality of tones with only one direction of the plurality of directions.

Example 138 includes the subject matter of Example 136, and optionally, wherein the mapping of the plurality of tones associates each tone with a respective direction of the plurality of directions.

Example 139 includes the subject matter of Example 136, and optionally, wherein the mapping of the plurality of tones associates two or more tones with a same direction of the plurality of directions.

Example 140 includes the subject matter of any one of Examples 136-139, and optionally, wherein a direction of the plurality of directions comprises an azimuth angle, an elevation angle, or a combination thereof.

Example 141 includes the subject matter of any one of Examples 136-140, and optionally, wherein the plurality of tones comprises a plurality of Orthogonal Frequency-Division Multiplexing (OFDM) tones of an OFDM symbol.

Example 142 includes the subject matter of any one of Examples 136-141, and optionally, comprising means for differentiating between the at least two sequential transmissions from the second wireless station based on one or more non-valid tones received between the at least two sequential transmissions.

Example 143 includes the subject matter of Example 142, and optionally, comprising means for processing an announcement frame from the second wireless station, the announcement frame comprising an indication of a number of the one or more non-valid tones.

Example 144 includes the subject matter of any one of Examples 136-143, and optionally, comprising means for processing an announcement frame from the second wireless station, the announcement frame comprising information indicating the mapping of the plurality of tones to the plurality of directions.

Example 145 includes the subject matter of any one of Examples 136-144, and optionally, wherein the plurality of directions covers an angle of 360 degrees.

Example 146 includes the subject matter of any one of Examples 136-145, and optionally, comprising means for estimating a location of the first wireless station based at least on the AoD from the second wireless station.

Example 147 includes the subject matter of any one of Examples 136-146, and optionally, wherein the second wireless station is an Access point (AP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus for a wireless station, the apparatus comprising:
   a memory; and
   a processor configured to cause the wireless station to:
      determine a beamforming scheme configured for Angle of Departure (AoD) estimation, the beamforming scheme comprising a plurality of beamforming settings to be applied to a respective plurality of antennas, the plurality of beamforming settings comprising one or more first beamforming settings to be applied to one or more first antennas of the plurality of antennas, and one or more second beamforming settings to be applied to one or more second antennas of the plurality of antennas, the one or more first antennas different from the one or more second antennas, the plurality of beamforming settings configured such that a combination of the plurality of beamforming settings, when applied to the plurality of antennas, are to configure the plurality of antennas to transmit a plurality of tones in a plurality of directions such that a direction is associated with at least one tone of the plurality of tones;
      transmit an announcement frame comprising information indicating a mapping of said plurality of directions to said plurality of tones; and
      sequentially transmit a plurality of transmissions according to the beamforming scheme by sequentially switching one or more transmit (Tx) chains between said plurality of antennas, sequentially transmitting the plurality of transmissions comprising applying the one or more first beamforming settings to a first transmission via the one or more first antennas, and, subsequent to the first transmission, applying the one or more second beamforming settings to a second transmission via the one or more second antennas.

2. The apparatus of claim 1 configured to cause the wireless station to transmit the first transmission via the one or more Tx chains and the one or more first antennas, and, subsequent to said first transmission, to switch said one or more Tx chains to the one or more second antennas to transmit the second transmission via said one or more second antennas.

3. The apparatus of claim 1 configured to cause the wireless station to sequentially transmit the plurality of transmissions by sequentially switching two or more Tx chains between said plurality of antennas.

4. The apparatus of claim 3 configured to cause the wireless station to transmit the first transmission via the two or more Tx chains and two or more first antennas of said plurality of antennas, and, subsequent to said first transmission, to switch said two or more Tx chains to two or more second antennas of said plurality of antennas to transmit the second transmission via said two or more second antennas.

5. The apparatus of claim 1 configured to cause the wireless station to sequentially switch a single Tx chain between said plurality of antennas to transmit each transmission of said plurality of transmissions via a respective antenna of said plurality of antennas.

6. The apparatus of claim 1, wherein said beamforming scheme is configured to transmit each tone of said plurality of tones in only one direction of said plurality of directions.

7. The apparatus of claim 1, wherein said beamforming scheme is configured to transmit each tone in a respective direction of said plurality of directions.

8. The apparatus of claim 1, wherein said beamforming scheme is configured to transmit two or more tones in a same direction of said plurality of directions.

9. The apparatus of claim 1, wherein the plurality of tones comprises a plurality of Orthogonal Frequency-Division Multiplexing (OFDM) tones of an OFDM symbol.

10. The apparatus of claim 1 configured to cause the wireless station to transmit one or more non-valid tones, which are not valid for the AoD estimation, between two consecutive transmissions of the plurality of transmissions.

11. The apparatus of claim 10, wherein the announcement frame comprises a count of the one or more non-valid tones.

12. The apparatus of claim 1, wherein the plurality of directions covers an angle of 360 degrees.

13. The apparatus of claim 1, wherein the direction comprises an azimuth angle, an elevation angle, or a combination thereof.

14. The apparatus of claim 1 comprising the plurality of antennas.

15. A product comprising one or more tangible computer-readable non-transitory storage media storing computer-executable instructions operable to, when executed by at least one processor, enable the at least one processor to cause a wireless station to:
   determine a beamforming scheme configured for Angle of Departure (AoD) estimation, the beamforming scheme comprising a plurality of beamforming settings to be applied to a respective plurality of antennas, the plurality of beamforming settings comprising one or more first beamforming settings to be applied to one or more first antennas of the plurality of antennas, and one or more second beamforming settings to be applied to one or more second antennas of the plurality of antennas, the one or more first antennas different from the one or more second antennas, the plurality of beamforming settings configured such that a combination of the plurality of beamforming settings, when applied to the plurality of antennas, are to configure the plurality of antennas to transmit a plurality of tones in a plurality of directions such that a direction is associated with at least one tone of the plurality of tones;
   transmit an announcement frame comprising information indicating a mapping of said plurality of directions to said plurality of tones; and
   sequentially transmit a plurality of transmissions according to the beamforming scheme by sequentially switching one or more transmit (Tx) chains between said plurality of antennas, sequentially transmitting the plurality of transmissions comprising applying the one or more first beamforming settings to a first transmission via the one or more first antennas, and, subsequent to the first transmission, applying the one or more second beamforming settings to a second transmission via the one or more second antennas.

16. The product of claim 15, wherein the instructions, when executed, cause the wireless station to sequentially transmit the plurality of transmissions by sequentially switching two or more Tx chains between said plurality of antennas.

17. The product of claim 15, wherein the instructions, when executed, cause the wireless station to transmit the first transmission via the one or more Tx chains and the one or more first antennas, and, subsequent to said first transmission, to switch said one or more Tx chains to the one or more second antennas to transmit the second transmission via said one or more second antennas.

18. An apparatus for a first wireless station, the apparatus comprising:
a memory; and
a processor configured to cause the first wireless station to:
process an announcement frame from a second wireless station, the announcement frame comprising information indicating a mapping of a plurality of tones to a plurality of directions;
determine a plurality of tone powers of said plurality of tones based on at least two sequential transmissions from said second wireless station, determining a tone power of a tone comprises summing up a plurality of received powers of the tone in the at least two sequential transmissions; and
determine an Angle of Departure (AoD) from the second wireless station, based on the plurality of tone powers and said mapping of the plurality of tones to the plurality of directions.

19. The apparatus of claim 18, wherein a direction of the plurality of directions comprises an azimuth angle, an elevation angle, or a combination thereof.

20. The apparatus of claim 18 configured to cause the first wireless station to differentiate between said at least two sequential transmissions from the second wireless station based on one or more non-valid tones received between said at least two sequential transmissions.

21. The apparatus of claim 18 configured to cause the first wireless station to determine a measurement corresponding to a location of the first wireless station based at least on the AoD from the second wireless station.

22. The apparatus of claim 18 comprising one or more antennas.

23. A product including one or more tangible computer-readable non-transitory storage media storing computer-executable instructions operable to, when executed by at least one processor, enable the at least one processor to cause a first wireless station to:
process an announcement frame from a second wireless station, the announcement frame comprising information indicating a mapping of a plurality of tones to a plurality of directions;
determine a plurality of tone powers of said plurality of tones based on at least two sequential transmissions from said second wireless station, determining a tone power of a tone comprises summing up a plurality of received powers of the tone in the at least two sequential transmissions; and
determine an Angle of Departure (AoD) from the second wireless station, based on the plurality of tone powers and said mapping of the plurality of tones to the plurality of directions.

24. The product of claim 23, wherein the instructions, when executed, cause the first wireless station to determine a measurement corresponding to a location of the first wireless station based at least on the AoD from the second wireless station.

* * * * *